(12) United States Patent
Kozlak et al.

(10) Patent No.: US 7,917,243 B2
(45) Date of Patent: Mar. 29, 2011

(54) METHOD FOR BUILDING THREE-DIMENSIONAL OBJECTS CONTAINING EMBEDDED INSERTS

(75) Inventors: David M. Kozlak, Minneapolis, MN (US); Donald J. Holzwarth, Minnetonka, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 580 days.

(21) Appl. No.: 12/006,955

(22) Filed: Jan. 8, 2008

(65) Prior Publication Data

US 2009/0174709 A1   Jul. 9, 2009

(51) Int. Cl.
*G06F 19/00* (2006.01)
*B29C 45/00* (2006.01)
*G06T 17/00* (2006.01)

(52) U.S. Cl. ........... 700/119; 700/98; 264/512; 345/420

(58) Field of Classification Search .................... 700/98, 700/118–120, 182; 264/510, 512; 345/419–420
See application file for complete search history.

(56) References Cited

U.S. PATENT DOCUMENTS

| | | | |
|---|---|---|---|
| 4,665,492 A | 5/1987 | Masters | |
| 5,059,266 A | 10/1991 | Yamane et al. | |
| 5,121,329 A | 6/1992 | Crump | |
| 5,131,706 A | 7/1992 | Appleberry | |
| 5,169,081 A | 12/1992 | Goedderz | |
| 5,173,220 A | 12/1992 | Reiff et al. | |
| 5,340,433 A | 8/1994 | Crump | |
| 5,426,722 A | 6/1995 | Batchelder | |
| 5,430,951 A | 7/1995 | Jacky | |
| 5,695,707 A | 12/1997 | Almquist et al. | |
| 5,705,117 A | 1/1998 | O'Connor et al. | |
| 5,807,437 A | 9/1998 | Sachs et al. | |
| 5,866,058 A | 2/1999 | Batchelder et al. | |
| 5,939,008 A | 8/1999 | Comb et al. | |
| 5,965,079 A * | 10/1999 | Manners | ........................ 264/401 |
| 6,028,410 A | 2/2000 | Leavitt et al. | |
| 6,054,077 A | 4/2000 | Comb et al. | |
| 6,129,872 A | 10/2000 | Jang | |
| 6,175,422 B1 | 1/2001 | Penn et al. | |
| 6,193,923 B1 | 2/2001 | Leyden et al. | |
| 6,228,923 B1 | 5/2001 | Lombardi et al. | |
| 6,275,157 B1 | 8/2001 | Mays et al. | |
| 6,471,800 B2 | 10/2002 | Jang et al. | |
| 6,574,523 B1 * | 6/2003 | Hanna et al. | .................. 700/120 |
| 6,600,965 B1 | 7/2003 | Hull et al. | |
| 6,629,011 B1 | 9/2003 | Calderon et al. | |

(Continued)

OTHER PUBLICATIONS

Office Action dated Jan. 7, 2010 from U.S. Appl. No. 12/006,947, filed Jan. 8, 2008.

(Continued)

*Primary Examiner* — Sean P Shechtman
(74) *Attorney, Agent, or Firm* — Brian R. Morrison; Westman, Champlin & Kelly, P.A.

(57) ABSTRACT

A method for generating build sequence data for a computer-aided design model of a three-dimensional object, the method comprising identifying a location of an insert data representation in the computer-aided design model, slicing the computer-aided design model into a plurality of sliced layers, generating a plurality of support layers for at least a portion of the plurality of sliced layers, and generating an unfilled region in the computer-aided design model at the identified location of the insert data representation.

20 Claims, 13 Drawing Sheets

U.S. PATENT DOCUMENTS

| | | |
|---|---|---|
| 6,685,866 B2 | 2/2004 | Swanson et al. |
| 6,722,872 B1 | 4/2004 | Swanson et al. |
| 6,730,252 B1 | 5/2004 | Teoh et al. |
| 6,813,594 B2 * | 11/2004 | Guertin et al. .................. 703/6 |
| 6,814,907 B1 | 11/2004 | Comb |
| 6,822,609 B2 | 11/2004 | Mendolia et al. |
| 6,893,590 B1 | 5/2005 | Rigosi et al. |
| 6,976,627 B1 | 12/2005 | Culp et al. |
| 7,185,734 B2 | 3/2007 | Widmer et al. |
| 2003/0004600 A1 | 1/2003 | Priedeman, Jr. |
| 2004/0012923 A1 | 1/2004 | Chen |
| 2004/0159978 A1 * | 8/2004 | Nielsen et al. .............. 264/308 |
| 2004/0175450 A1 | 9/2004 | Yanagisawa et al. |
| 2005/0023145 A1 | 2/2005 | Cohen et al. |
| 2005/0147781 A1 | 7/2005 | Dronzek, Jr. et al. |
| 2005/0173838 A1 | 8/2005 | Priedeman et al. |
| 2005/0194401 A1 | 9/2005 | Khoshnevis et al. |
| 2006/0158456 A1 | 7/2006 | Zinniel et al. |
| 2007/0071902 A1 | 3/2007 | Dietrich et al. |
| 2007/0233298 A1 | 10/2007 | Heide et al. |
| 2008/0006966 A1 | 1/2008 | Mannella |

OTHER PUBLICATIONS

Product Description, RepRap Pick and Place Tool, taken from www.reprap.org, published Feb. 11, 2007.

International Search Report and Written Opinion for PCT/US2008/013663.

Office Action dated May 13, 2010 from U.S. Appl. No. 12/006,956, filed Jan. 8, 2008.

Office Action dated Jul. 8, 2010 from U.S. Appl. No. 12/006,947, filed Jan. 8, 2008.

Wohler's Report 2007, Part 6: Rapid Manufacturing, Whohler's Associates, Inc., pp. 126-127 and 136-137, Published May 1, 2007.

* cited by examiner

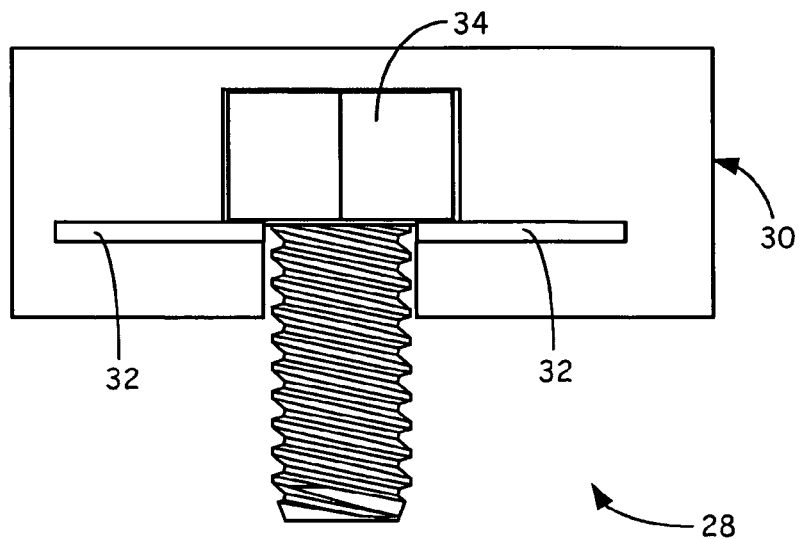
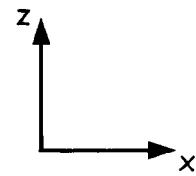
Fig. 2A
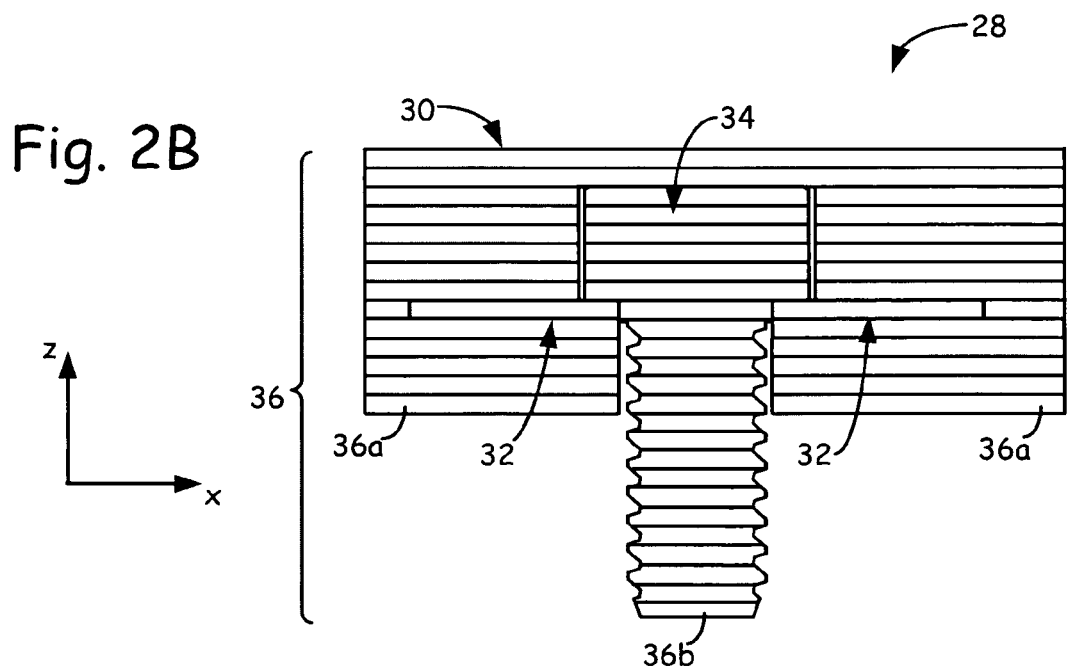
Fig. 2B

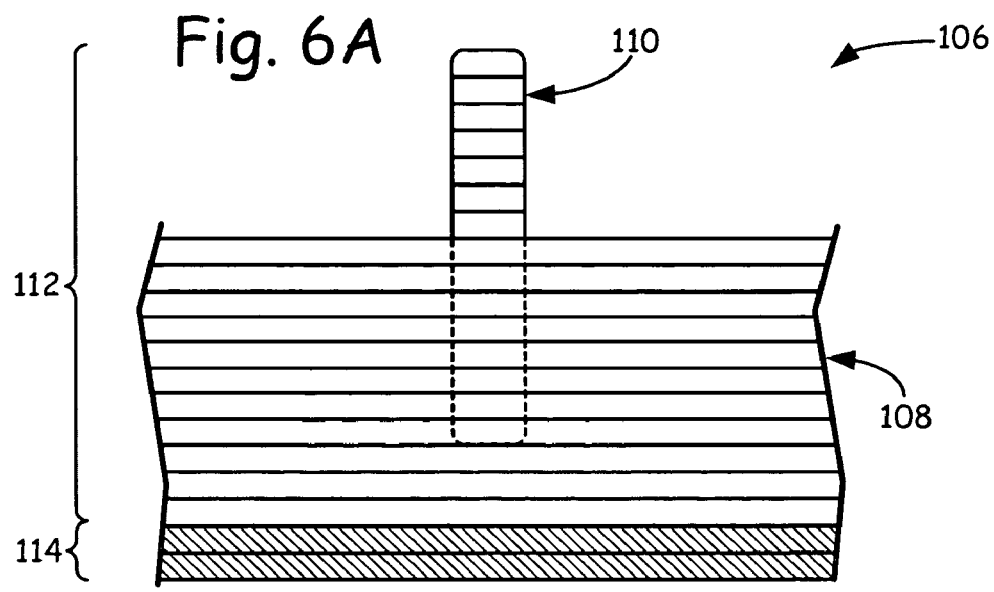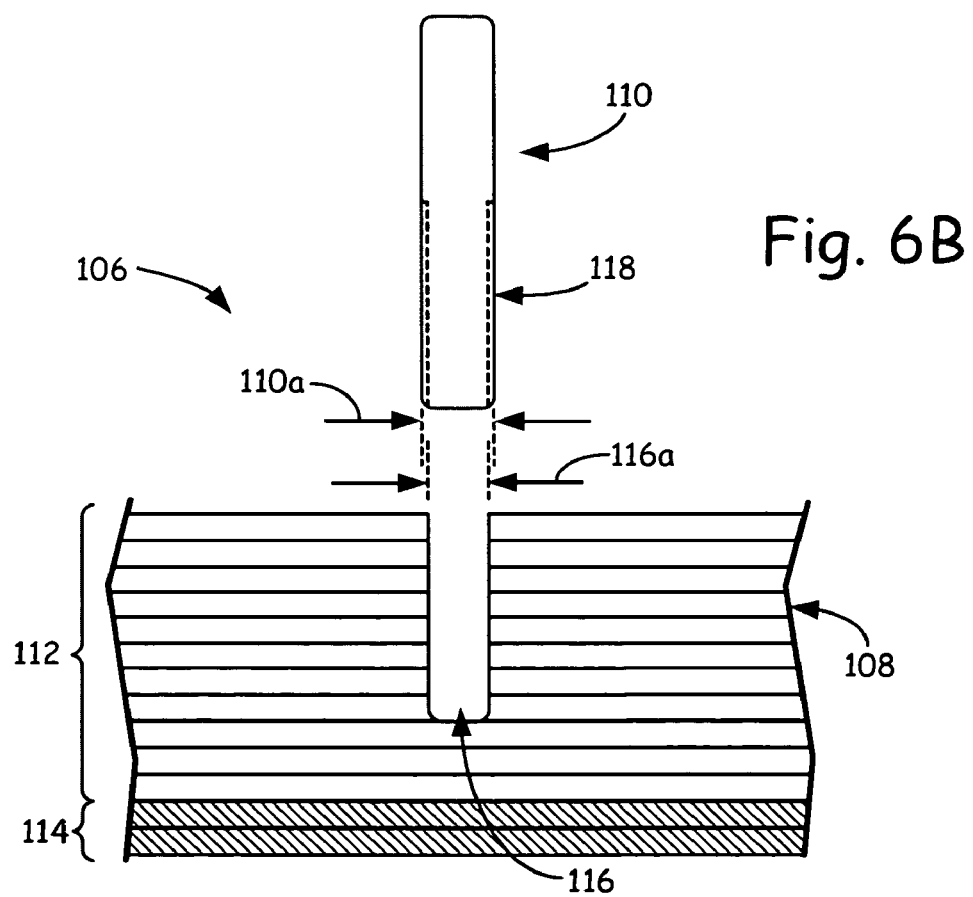

METHOD FOR BUILDING THREE-DIMENSIONAL OBJECTS CONTAINING EMBEDDED INSERTS

CROSS-REFERENCE TO RELATED APPLICATION(S)

Reference is hereby made to co-pending U.S. patent application Ser. No. 12/006,956 filed on even date, and entitled "Method for Building and Using Three-Dimensional Objects Containing Embedded Identification-Tag Inserts"; and to co-pending U.S. patent application Ser. No. 12/006,947 filed on even date, and entitled "System for Building Three-Dimensional Objects Containing Embedded Inserts, and Methods of Use Thereof".

BACKGROUND

The present invention relates to methods for building three-dimensional (3D) objects. In particular, the present invention relates to methods for generating build sequence data for building 3D objects with layer-based additive techniques.

Rapid prototyping/rapid manufacturing (RP/RM) systems are used to build 3D objects from computer-aided design (CAD) models using one or more layer-based additive techniques. Examples of commercially available layer-based additive techniques include fused deposition modeling, ink jetting, selective laser sintering, electron-beam melting, and stereo lithographic processes. For each of these techniques, the CAD model of the 3D object is initially sliced into multiple horizontal layers. For each sliced layer, a build path is then generated, which provides instructions for the particular RP/RM system to form the given layer. For deposition-based systems (e.g., fused deposition modeling and ink jetting), the build path defines the pattern for depositing roads of build material from a moveable deposition head to form the given layer. Alternatively, for energy-application systems (e.g., selective laser sintering, electron-beam melting, and stereo lithographic processes), the build path defines the pattern for emitting energy from a moveable energy source (e.g., a laser) to form the given layer.

In fabricating 3D objects by depositing layers of build materials, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. The support material adheres to the build material during fabrication, and is removable from the completed 3D object when the build process is complete.

While layer-based additive techniques provide durable 3D objects with high resolutions, there is an increasing demand for 3D objects containing embedded inserts, where the embedded inserts are not necessarily fabricated with the layer-based additive techniques. For example, consumers may request 3D objects containing pre-inserted bolts for allowing the 3D objects to be subsequently secured to other components. A common issue with the use of embedded inserts is generating the build data for the 3D objects that contain the embedded inserts. As such, there is a need for methods for building 3D objects containing embedded inserts that allow for accurate placements of inserts during the build operations.

SUMMARY

The present invention relates to a method for generating build sequence data for a CAD model of a 3D object. The method includes identifying a location of an insert data representation in the CAD model, slicing the CAD model into a plurality of sliced layers, generating support layers for at least a portion of the sliced layers, and generating an unfilled region in the CAD model at the identified location of the insert data representation.

BRIEF DESCRIPTION OF THE DRAWINGS

FIGS. 2A-2D are schematic views of a CAD model, which illustrate the application of the method shown in FIG. 1.

FIGS. 6A and 6B are schematic views of a third CAD model, which illustrate an alternative application of the method shown in FIG. 1.

DETAILED DESCRIPTION

Figure 1:
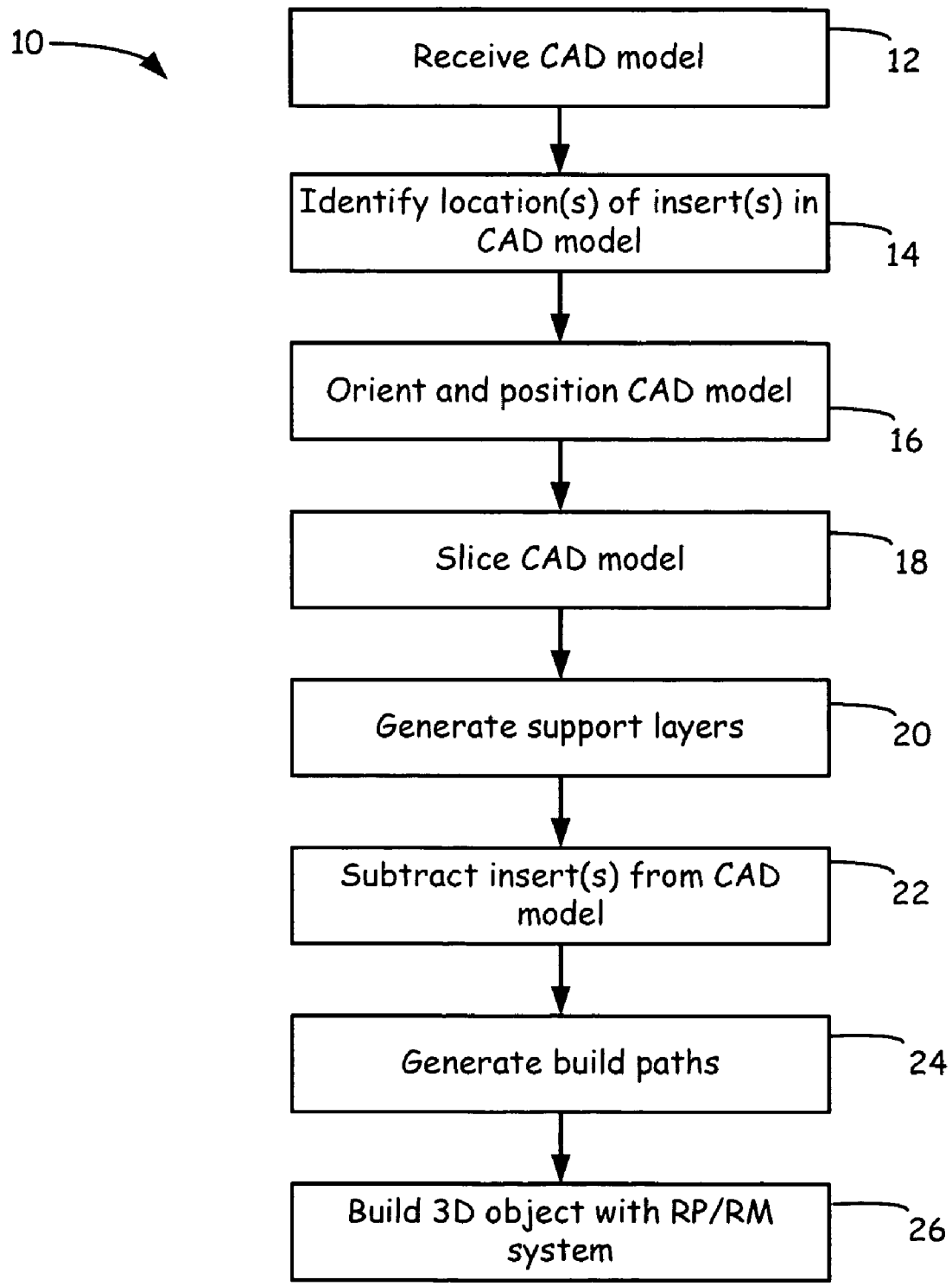
FIG. 1 is a flow diagram of a method for generating build sequence data for a 3D object containing one or more embedded inserts.

FIG. 1 is a flow diagram of method 10 for generating build sequence data for a 3D object containing one or more embedded inserts, where the 3D object is built with an RP/RM system. Method 10 includes steps 12-26, and is desirably performed with a host computer of the RP/RM system. This reduces the amount of work required by a designer of the CAD model for building the 3D object. Accordingly, the host computer initially receives a CAD model of the 3D object (step 12) to begin the data analysis, where the CAD model is desirably in a data format compatible with the RP/RM system (e.g., STL-format data files). The host computer may receive the CAD model from a variety of sources, such as data downloads and file transfers. For example, a designer of the CAD model may submit the CAD model to an operator of the RP/RM system, and the operator may load the CAD model to the host computer for analysis.

In one embodiment, the CAD model received by the host computer includes a data representation of the 3D object and data representations of one or more inserts. For example, the designer of the CAD model may include the insert data representation(s) while creating the CAD model. In this embodiment, the insert data representation(s) (e.g., STL data files of the one or more inserts) are desirably distinguishable from the data representation of the 3D object (e.g., STL data file of the 3D object) such that the host computer is capable of identifying the insert data representation(s) in the CAD model.

Alternatively, the CAD model received by the host computer may only include a data representation of the 3D object. In this embodiment, the host computer may then generate the data representations of the insert(s) to be placed in the 3D object. This embodiment is suitable for placing one or more inserts within the 3D object, where the designer of the CAD model is unaware of, or unconcerned with, the insert(s). For example, the insert(s) may include embedded identification tag inserts, as disclosed in U.S. patent application Ser. No. 12/006,956 entitled "Method for Building and Using Three-Dimensional Objects Containing Embedded Identification-Tag Inserts".

Upon receipt of the CAD model, the host computer identifies the locations and orientations of the insert data representation(s) in the CAD model (step 14). In the first above-discussed embodiment, in which the insert data representation(s) are included in the received CAD model, the host computer identifies the locations and orientations of the insert data representation(s) in the 3D object data representation. In the above-discussed alternative embodiment, in which the host computer generates the insert data representation(s), the identified locations and orientations of the insert data representation(s) may be determined based on build parameters to place the insert(s) at desired locations within the 3D object. For example, the host computer may generate the locations and orientations of the insert data representation(s) to ensure that the insert(s) are fully embedded within a filled portion of the 3D object.

The host computer then orients and positions the CAD model in a spatial coordinate system to a desired orientation for the build operation (step 16). For example, the CAD model may be positioned and oriented to minimize the amount of support material required to provide vertical support for the 3D object and the insert(s) during the build operation. Examples of suitable techniques for orienting and positioning the CAD model in the spatial coordinate system are disclosed in Heide et al., U.S. patent application Publication No. 2007/0233298, entitled "Method for Optimizing Spatial Orientations of Computer-Aided Design Models", where the techniques also take the placements of the insert(s) into consideration when orienting and positioning the CAD model.

After the CAD model is oriented and positioned in the spatial coordinate system, the host computer slices the CAD model into a plurality of horizontal layers (step 18). Each sliced layer desirably includes one or more polylines that define the geometry of the sliced layer. Each polyline is defined by multiple primary vertices interconnected with linear segments, where each primary vertex is a coordinate point in the horizontal plane that represents a point of angular deflection between a pair of the linear segments.

The host computer then generates support layers for providing vertical support to any overhanging surfaces of the sliced layers of the CAD model (step 20). Each support layer also desirably includes one or more polylines that define the geometry of the given support layer. After the support layers are generated, the host computer subtracts the geometries of the insert data representation(s) from the CAD model (step 22). The subtraction operation may be performed with a Boolean subtraction technique, which modifies the polylines of the sliced layers of the CAD model, thereby providing unfilled region(s) at the identified locations of the insert data representation(s). The dimensions of the unfilled region(s) may also be offset to provide dimensions that are slightly greater than or less than the geometries of the insert data representation(s), thereby respectively providing loose or tight clearance fits. As discussed below, subtracting the geometries of the insert data representation(s) in step 22, after the support layers are generated in step 20, is beneficial for preventing the support layers from being generated in the unfilled region(s). This would otherwise prevent the insert(s) from being placed within the 3D object during the build operation.

The host computer then generates build paths for the sliced layers of the 3D object and the generated support layers (step 24), where the build paths are desirably based on the polylines of the sliced layers and the support layers. The build paths are tool paths (e.g., perimeter and raster tool paths) for forming the sliced layers with a build material, and for forming the support layers with a support material. For example, in deposition-based RP/RM systems (e.g., fused deposition modeling and ink jetting systems), the build paths correspond to the patterns of deposited build or support materials for each layer. Alternatively, for energy-application RP/RM systems (e.g., selective laser sintering, electron-beam melting, and stereo lithographic systems), the build paths correspond to the patterns that the emitted energy follow to fuse or crosslink the build or support materials for each layer. The host computer may also generate one or more pause times in the build sequence for allowing the insert(s) to be placed in the 3D object.

After the build paths are generated, the resulting build sequence data is relayed to an RP/RM system for performing the build operation to fabricate the 3D object and corresponding support layers (step 26). During the build operation, the insert(s) may be placed in the 3D object manually or in an automated manner. In one embodiment, the RP/RM system is a system that includes an automated insert-placement apparatus as disclosed in U.S. patent application Ser. No. 12/006,947 entitled "System for Building Three-Dimensional Objects Containing Embedded Inserts, and Methods of Use Thereof". Method 10 correspondingly prevents build and support materials from filling the region(s) in which the insert(s) are to be placed during the build operation. This allows the insert(s) to be readily placed in the 3D object substantially without interference from the formed layers of the 3D object and the support layers.

Figure 2C:
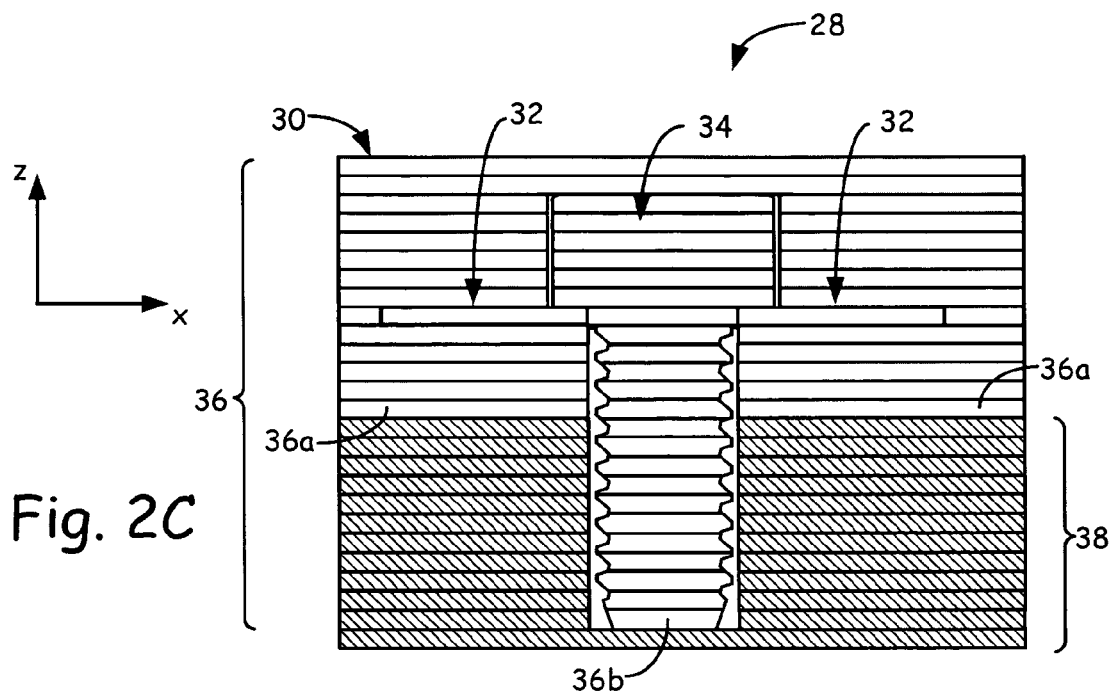

FIGS. 2A-2D are schematic views of CAD model 28, which illustrate the application of steps 12-24 of method 10 (shown in FIG. 1) to an exemplary 3D object. As shown in FIG. 2A, CAD model 28 is a data representation of the exemplary 3D object, and includes STL object 30 and STL inserts 32 and 34. STL object 30 is a data representation of the 3D object to be built in a layer-by-layer manner with the RP/RM system (not shown). STL inserts 32 and 34 are data representations of a ring washer and a hex bolt, respectively, which are inserts that will be placed in the 3D object during the build operation. As shown, the ring washer geometry of STL insert 32 is disposed within STL object 30, and is generally oriented in a horizontal x-y plane. The horizontal x-y plane is a plane defined by an x-axis and a y-axis (not shown in FIG. 2A), where the x-axis, the y-axis, and the z-axis are orthogonal to each other. As used herein, the term "axis" refers to a coordinate axis of a spatial coordinate system (e.g. a Cartesian coordinate system). In comparison, the hex bolt geometry of STL insert 34 is partially embedded within STL object 30, and extends below STL object 30 generally along the z-axis.

Pursuant to method 10, the host computer receives CAD model 28 (step 12), and identifies the locations and orientations of STL inserts 32 and 34 (step 14). The host computer then orients and positions CAD model 28 along the x-axis, the y-axis, and the z-axis for the build operation (step 16). For ease of discussion, it is assumed that the orientation shown in FIG. 2A is the desired orientation of CAD model 28 for the build operation.

As shown in FIG. 2B, the host computer then slices CAD model 28 into sliced layers 36 (step 18), where sliced layers 36 are a plurality of layers disposed along the horizontal x-y plane. As discussed above, each sliced layer 36 desirably includes one or more polylines that define the geometry of the sliced layer in the horizontal x-y plane, and has a thickness corresponding to the vertical z-axis resolution of the RP/RM system. The thicknesses of sliced layers 36 are exaggerated in FIG. 2B for ease of discussion. As shown, because the slicing algorithm used by the host computer typically does not distinguish the different data representations in CAD model 28, sliced layers 36 extend through STL object 30 and STL inserts 32 and 34.

After sliced layers 36 are formed, the host computer then generates support layers for any overhanging portions of sliced layers 36 that require vertical support along the z-axis (step 20). In the example shown in FIG. 2B, sliced layers 36a and 36b are the portions of sliced layers 36 that are vertically unsupported along the z-axis, and require support layers. In one embodiment, the positioning of CAD model 28 in step 16 of method 10 may position sliced layer 36b at the lowest point in the spatial coordinate system, thereby precluding the need to generate support layers for sliced layer 36b. However, the host computer desirably positions CAD model 28 in the spatial coordinate system such that at least one support layer is generated below the sliced layers. This assists the removal of the resulting 3D object after the build operation is complete.

FIG. 2C shows CAD model 28 with generated support layers 38, which are a plurality of support layers disposed along the horizontal x-y plane having thicknesses corresponding to the vertical z-axis resolution of the RP/RM system (not shown). As discussed above, STL insert 34 extends below STL object 30. Thus, CAD model 28 is located at an elevated position along the z-axis such that the hex bolt insert corresponding to STL insert 34 may be properly placed in the 3D object. Support layers 38 provide vertical support along the z-axis for sliced layers 36a and 36b, thereby allowing the 3D object corresponding to STL object 30 to be built in a layer-by-layer manner with the RP/RM system. After support layers 38 are generated in step 20 of method 10, the host computer then subtracts the geometries of STL inserts 32 and 34 from CAD model 28 (step 22).

Figure 2D:
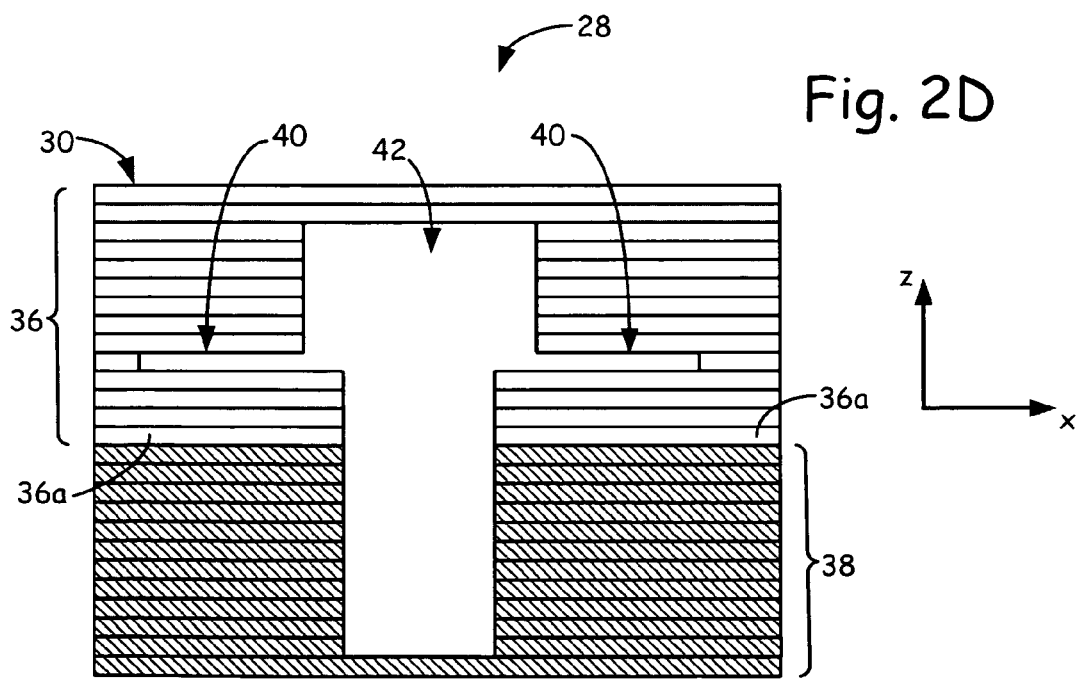

As shown in FIG. 2D, the subtraction operation modifies the polylines of sliced layers 36, thereby providing unfilled regions 40 and 42 at the respective locations of STL inserts 32 and 34. Unfilled regions 40 and 42 allow the ring washer insert and the hex bolt insert to be properly inserted within the 3D object during the build operation, without interference from the formed layers of the 3D object and support layers. The host computer then generates build paths for sliced layers 36 and support layers 38 (step 24), where the build paths of sliced layers 36 and support layers 38 do not enter unfilled regions 40 and 42. The resulting build sequence data is then relayed to the RP/RM system (not shown) for performing the build operation to fabricate the 3D object and corresponding support layers (step 26).

Figure 3A:
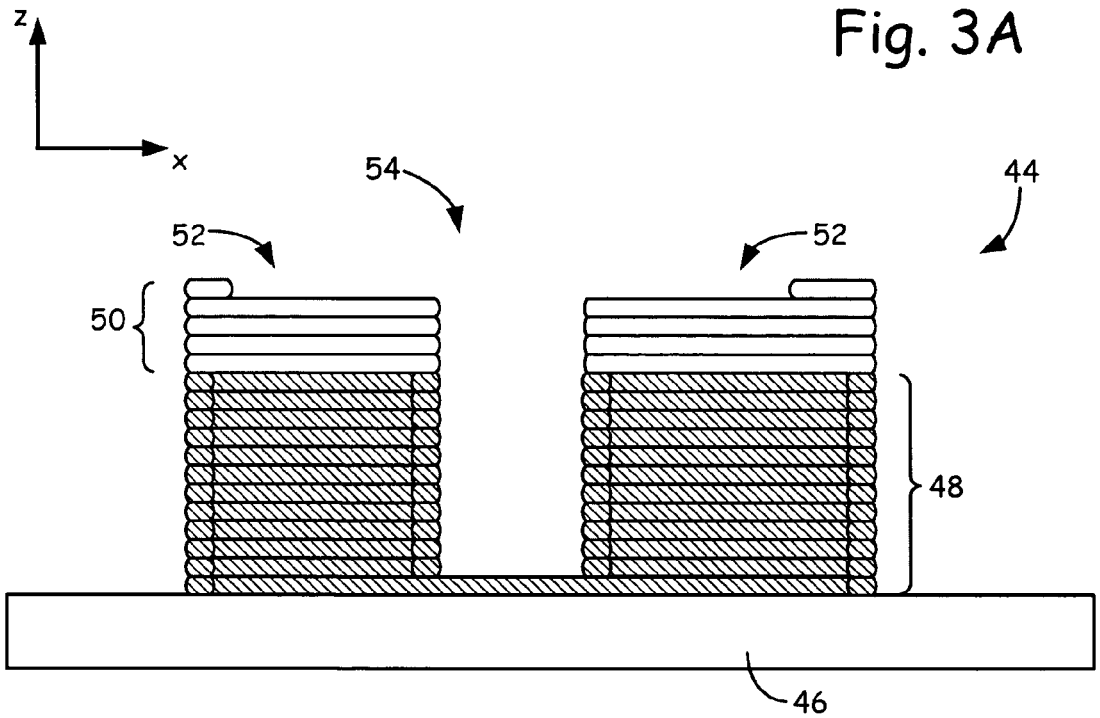
FIGS. 3A-3D are front schematic views of an exemplary 3D object being built based on the CAD model shown in FIGS. 2A-2D.

FIGS. 3A-3D are front schematic views of 3D object 44 being built on substrate platform 46 of an RP/RM system (not shown), where 3D object 44 is built based on the build sequence data obtained from CAD model 28 (shown in FIGS. 2A-2D), pursuant to step 26 of method 10 (shown in FIG. 1). As shown in FIG. 3A, during the build operation, support layers 48 are initially formed on substrate platform 46 based on the generated support paths of support layers 38 (shown in FIG. 2D). This positions 3D object 44 at a desired height along the z-axis for the placement of the inserts (not shown in FIG. 3A).

The RP/RM system then forms build layers 50 of 3D object 44, where build layers 50 are based on the generated build paths of sliced layers 36 (shown in FIG. 2D). Accordingly, support layers 48 and build layers 50 partially define regions 52 and 54, which correspond to unfilled regions 40 and 42 in CAD model 28 (shown in FIG. 2D). As further shown in FIG. 3A, support layers 48 and build layers 50 are formed up to the point where a first insert (not shown in FIG. 3A) is to be placed in 3D object 44. This is desirable for deposition-based RP/RM systems to reduce the risk of collisions between the deposition head and the placed insert during the build operation.

Figure 3B:
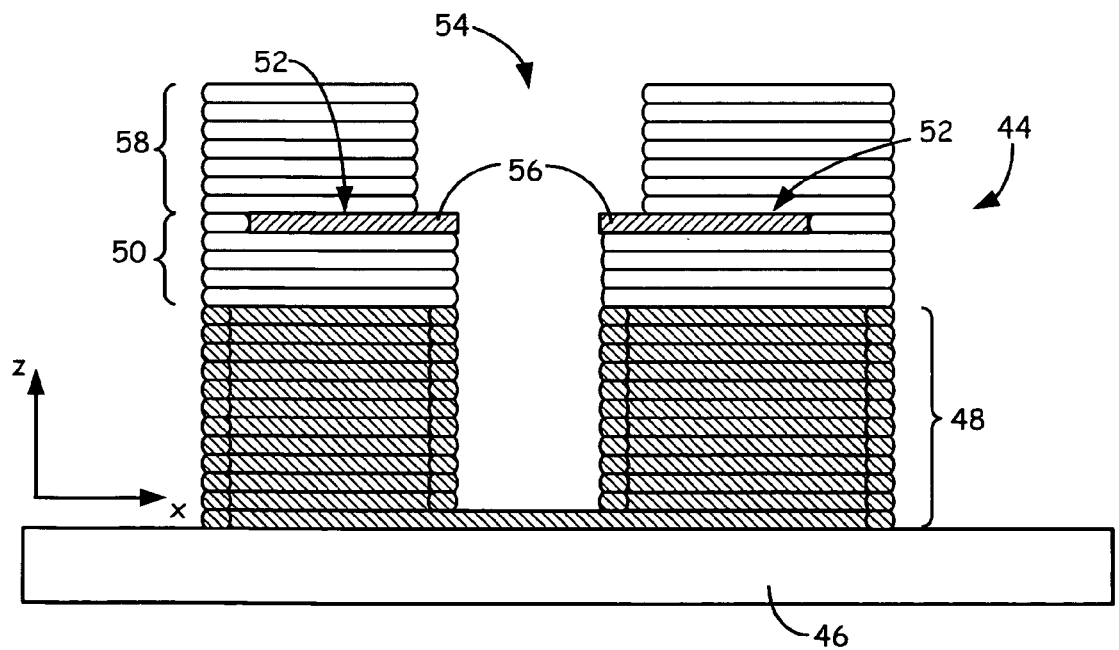

FIG. 3B shows 3D object 44 after ring washer 56 is placed in region 52, and build layers 58 are formed. After build layers 50 are formed, ring washer 56 is placed in 3D object 44 at region 52, where ring washer 56 is an insert corresponding to STL insert 32 (shown in FIGS. 3A-3C). As discussed above, ring washer 56 may be placed in region 52 manually or in an automated manner. The placement of ring washer 56 in region 52 desirably provides a substantially flush surface between ring washer 56 and the top layer of build layers 50, thereby reducing the risk of collisions between a deposition head of the RP/RM system and ring washer 56 while build layers 58 are formed.

As used herein, the term "substantially flush" refers to arrangements where the surfaces are flush (i.e., coplanar) or where the top surface of the insert (e.g., the top surface of ring washer 56) is slightly below the top layer of the build layers (e.g., the top layer of build layers 50) along the vertical z-axis. Layer-based additive processes of RP/RM systems are capable of making up the differences for vertical offsets that are within a few layers below the top layer of the build layers. Accordingly, suitable vertical offsets between the top surfaces of the inserts and the top layers of the build layers include thicknesses ranging from coplanar surfaces to distances of about three layers, with particularly suitable vertical offsets ranging from coplanar surfaces to distances of about one layer, where the non-coplanar distances of the top surfaces of the inserts extend below the top layers of the build layers along the vertical z-axis.

After ring washer 56 is placed in region 52, the RP/RM system then forms build layers 58 of 3D object 44 on top of build layers 50 and ring insert 56, where build layers 58 are also based on the generated build paths of sliced layers 36 (shown in FIG. 2D). Accordingly, build layers 58 further define region 54, which corresponds to unfilled region 42 in CAD model 28 (shown in FIG. 2D).

Figure 3C:
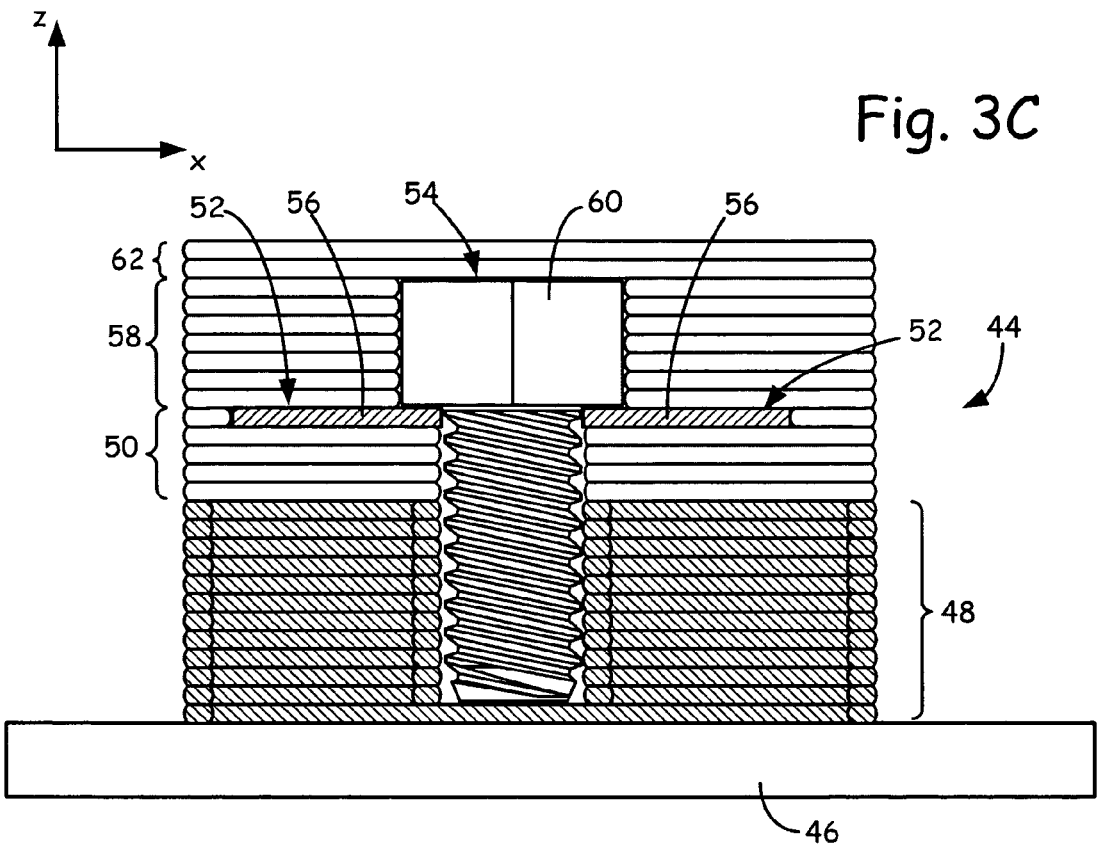

FIG. 3C shows 3D object 44 after hex bolt 60 is placed in region 54, and build layers 62 are formed. After build layers 58 are formed, hex bolt 60 is placed in 3D object 44 at region 54, such that hex bolt 60 extends through ring washer 56. Hex bolt 60 is an insert corresponding to STL insert 34 (shown in FIGS. 2A-2C), and may be placed in region 54 manually or in an automated manner. The placement of hex bolt 60 in region 54 desirably provides a substantially flush surface between hex bolt 60 and the top layer of build layers 58. After hex bolt 60 is placed in region 54, the RP/RM system then forms build layers 62 of 3D object 44 on top of build layers 58 and hex bolt 60, where build layers 62 are also based on the generated build paths of sliced layers 36 (shown in FIG. 2D). After the build operation is complete, the resulting 3D object 44 may be removed from the RP/RM system, and support layers 48 may be removed.

Figure 3D:
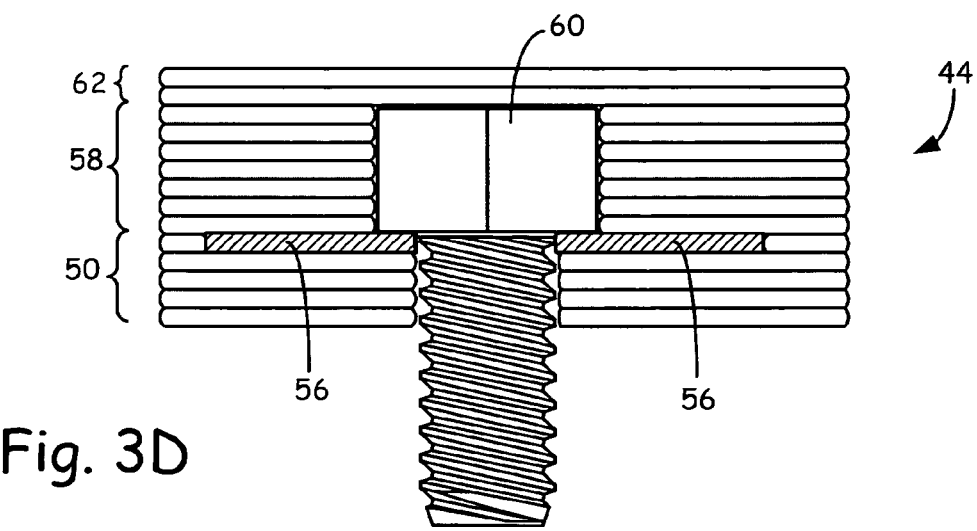

FIG. 3D shows 3D object 44 after removal from the RP/RM system, and after support layers 48 (shown in FIG. 3C) are removed. The resulting 3D object 44 includes ring washer 56 and hex bolt 60 embedded within the layers of 3D object 44 (i.e., build layers 50, 58, and 62), which corresponds to the data representations of CAD model 28 (shown in FIG. 2A). As discussed above, pursuant to method 10, ring washer 56 and hex bolt 60 are properly placed in 3D object 44 due to the formation of unfilled regions 40 and 42 (shown in FIG. 2D) after support layers 38 (shown in FIGS. 2C and 2D) are generated. This allowed ring washer 56 and hex bolt 60 to be readily placed in 3D object 44 without interference from support layers 48 and build layers 50, 58, and 62.

Figure 4A:
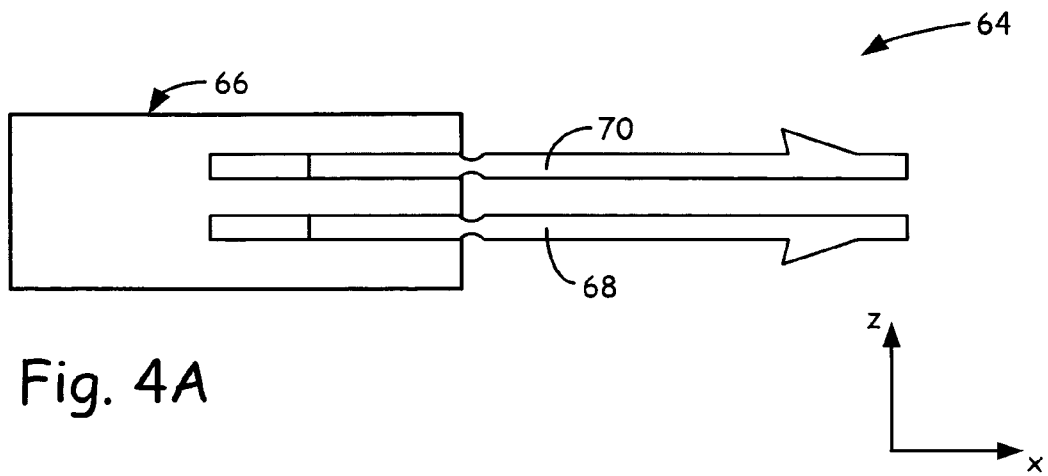
FIGS. 4A-4D are schematic views of a second CAD model, which further illustrate the application of the method shown in FIG. 1.

FIGS. 4A-4D are schematic views of CAD model 64, which illustrate the application of steps 12-24 of method 10 (shown in FIG. 1) to a second exemplary 3D object. As shown in FIG. 4A, CAD model 64 is a data representation of the second exemplary 3D object, and includes STL object 66 and STL inserts 68 and 70. STL object 66 is a data representation of the 3D object to be built in a layer-by-layer manner with the RP/RM system (not shown). STL inserts 68 and 70 are data representations of opposing snap fasteners, which are inserts that will be placed in the 3D object during the build operation. As shown, the geometries of STL inserts 68 and 70 are each partially embedded within STL object 66, and extend laterally from STL object 66 in the horizontal x-y plane.

Pursuant to method 10, the host computer receives CAD model 64 (step 12), and identifies the locations and orientations of STL inserts 68 and 70 (step 14). The host computer then orients and positions CAD model 64 along the x-axis, the y-axis, and the z-axis for the build operation (step 16). For ease of discussion, it is assumed that the orientation shown in FIG. 4A is the desired orientation of CAD model 64 for the build operation.

Figure 4B:
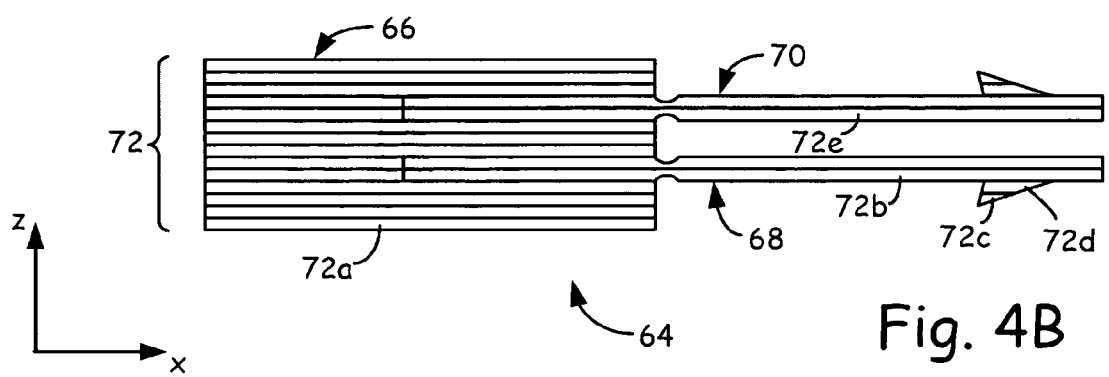

As shown in FIG. 4B, the host computer then slices CAD model 64 into sliced layers 72 (step 18), where sliced layers 72 are a plurality of layers disposed along the horizontal x-y plane. Each sliced layer 72 desirably includes one or more polylines that define the geometry of the sliced layer in the horizontal x-y plane, and has a thickness corresponding to the vertical z-axis resolution of the RP/RM system. The thicknesses of sliced layers 72 are exaggerated in FIG. 4B for ease of discussion.

After sliced layers 72 are formed, the host computer then generates support layers for any overhanging portions of sliced layers 72 that require vertical support along the z-axis (step 20). In the example shown in FIG. 4B, sliced layers 72a-72e are the portions of sliced layers 72 that are vertically unsupported along the z-axis, and require support layers. Sliced layer 72a is the bottom layer of STL object 66. As discussed above for CAD model 28 (shown in FIG. 4B), the host computer desirably positions CAD model 64 in the spatial coordinate system such that at least one support layer is generated below the sliced layers, including sliced layer 72a. This assists the removal of the resulting 3D object after the build operation is complete.

As shown, STL inserts 68 and 70 extend laterally beyond STL object 66 in the horizontal x-y plane. Thus, the snap fastener inserts corresponding to STL inserts 68 and 70 are retained in the 3D object corresponding to STL object 66 in a cantilevered manner, and will require vertical support during the build operation. In particular, sliced layers 72b-72d are bottom layers at STL insert 68, and will require vertical support along the z-axis when the snap fastener insert corresponding to STL insert 68 is placed in the 3D object. Sliced layer 72e is the bottom layer at STL insert 70, and will also require vertical support along the z-axis when the snap fastener insert corresponding to STL insert 70 is placed in the 3D object.

Figure 4C:
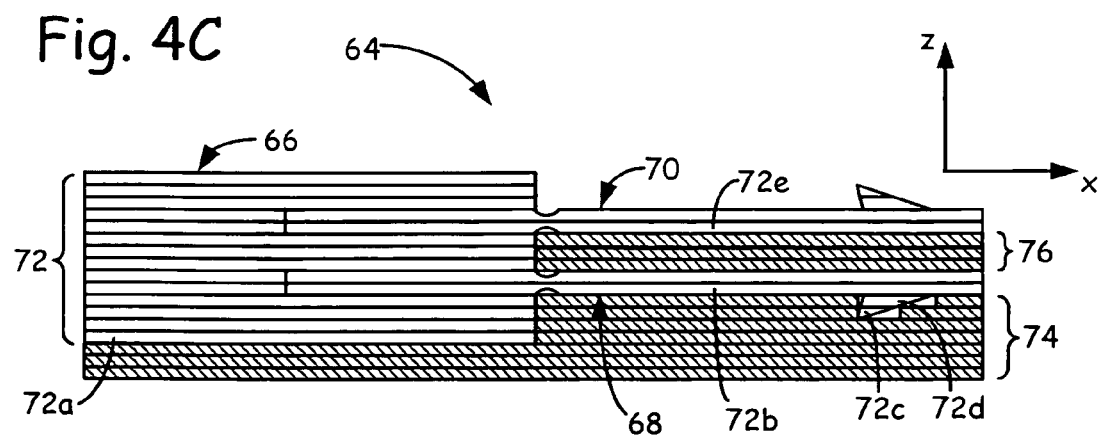

FIG. 4C shows CAD model 64 with generated support layers 74 and 76, where support layers 74 and 76 are disposed along the horizontal x-y plane and have thicknesses corresponding to the vertical z-axis resolution of the RP/RM system. As shown, support layers 74 provide vertical support to sliced layers 72 at STL object 66 and at STL insert 68. Similarly, support layers 76 are disposed between STL inserts 68 and 70 for providing vertical support to STL insert 70. After support layers 74 and 76 are generated in step 20 of method 10, the host computer then subtracts the geometries of STL inserts 68 and 70 from CAD model 64 (step 22).

Figure 4D:
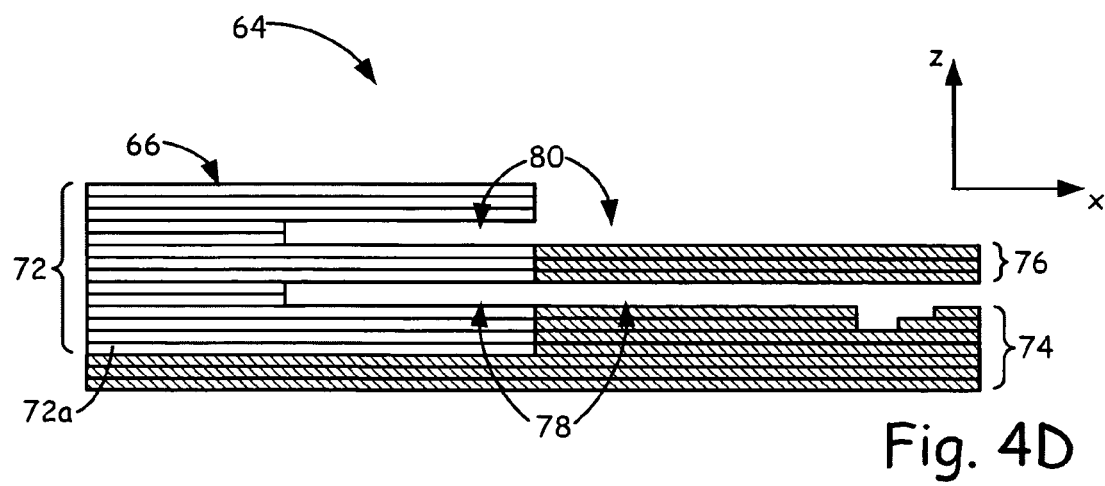

As shown in FIG. 4D, the subtraction operation modifies the polylines of sliced layers 72, thereby providing unfilled regions 78 and 80 at the respective locations of STL inserts 68 and 70 (shown in FIGS. 4A-4C). Unfilled regions 78 and 80 allow the snap fastener inserts to be properly inserted within the 3D object during the build operation, without interference from the formed layers of the 3D object and support layers. The host computer then generates build paths for sliced layers 72 and support layers 74 and 76 (step 24), where the build paths of sliced layers 72 and support layers 74 and 76 do not enter unfilled regions 78 and 80. The resulting build sequence data is relayed to the RP/RM system (not shown) for performing the build operation to fabricate the 3D object and corresponding support structure (step 26).

Figure 5A:
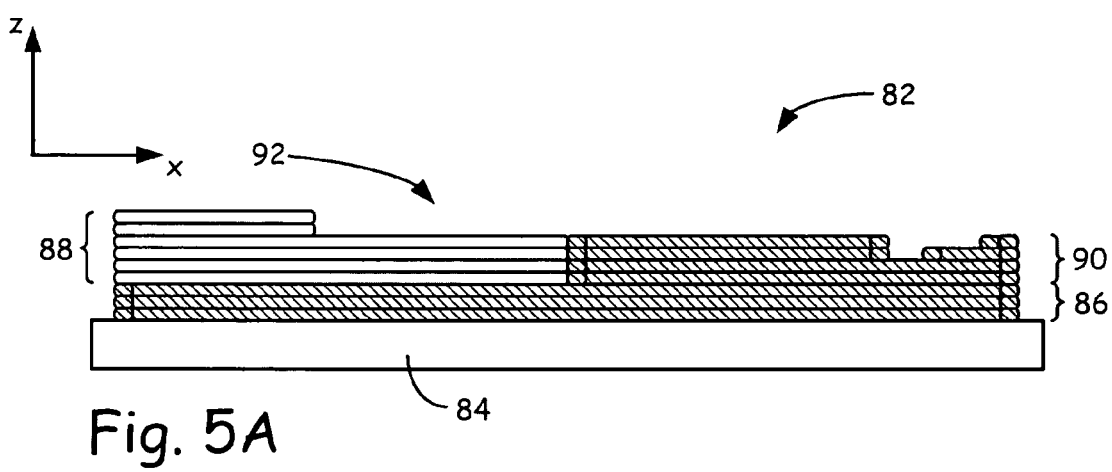
FIGS. 5A-5E are front schematic views of a second exemplary 3D object being built based on the second CAD model shown in FIGS. 4A-4D.

FIGS. 5A-5D are front schematic views of 3D object 82 being built on substrate platform 84 of an RP/RM system (not shown), where 3D object 82 is built based on the build sequence data obtained from CAD model 64 (shown in FIGS. 4A-4D), pursuant to step 26 of method 10 (shown in FIG. 1). As shown in FIG. 5A, during the build operation, support layers 86 are formed on substrate platform 84, based on the generated support paths of support layers 74 (shown in FIG. 4D). This positions 3D object 82 at a desired height along the z-axis for subsequent build steps.

The RP/RM system then forms build layers 88 and support layers 90 on top of the previously formed support layers 86, where build layers 88 are based on the generated build paths of sliced layers 72 (shown in FIG. 4D) and support layers 90 are based on the generated support paths of support layers 74 (shown in FIG. 4D). Accordingly, support layers 90 provide vertical support for the cantilevered portions of the inserts (not shown in FIG. 5A), and build layers 88 and support layers 90 partially define region 92, which corresponds to unfilled region 78 in CAD model 64 (shown in FIG. 4D).

Figure 5B:
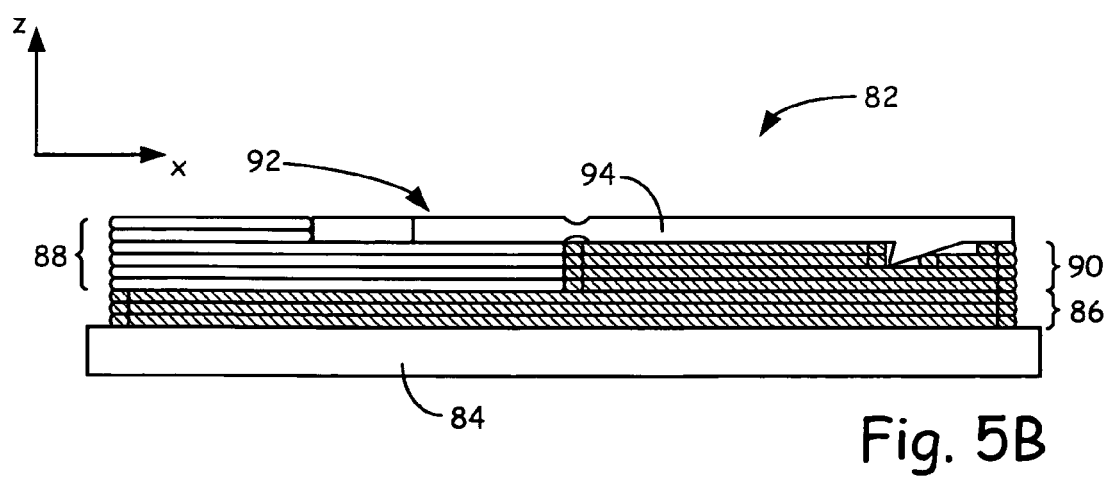

FIG. 5B shows 3D object 82 with snap fastener 94 is placed in region 92. After build layers 88 and support layers 90 are formed, snap fastener 94 is placed in 3D object 82 at region 92, where snap fastener 94 is an insert corresponding to STL insert 68 (shown in FIGS. 4A-4C). Snap fastener 94 may be placed in region 92 manually or in an automated manner, and the placement of snap fastener 94 in region 92 desirably provides a substantially flush surface between snap fastener 94 and the top layer of build layers 88. As discussed above, this reduces the risk of collisions between a deposition head of the RP/RM system and snap fastener 94 while subsequent build layers are formed.

Figure 5C:
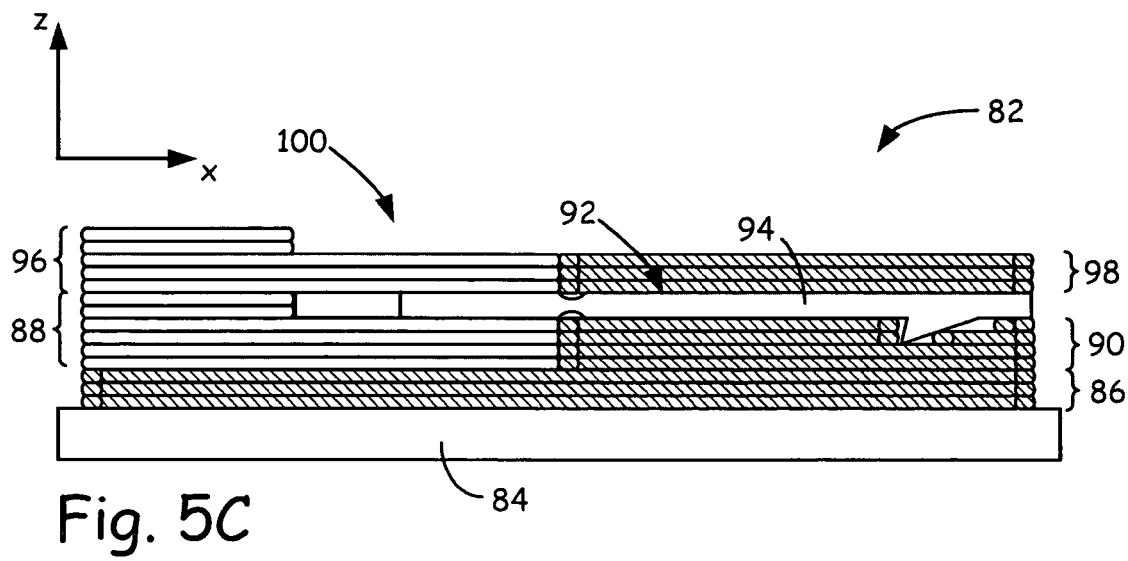

As shown in FIG. 5C, after snap fastener 94 is placed in region 92, the RP/RM system then forms build layers 96 of 3D object 82 on top of build layers 88 and snap fastener 94, where build layers 96 are also based on the generated build paths of sliced layers 72 (shown in FIG. 4D). While forming build layers 96, the RP/RM system also forms support layers 98 on top of snap fastener 94, where support layers 98 are based on the generated build paths of support layers 76 (shown in FIG. 4D). Accordingly, build layers 96 and support layers 98 partially define region 100, which corresponds to unfilled region 80 in CAD model 64 (shown in FIG. 4D).

Figure 5D:
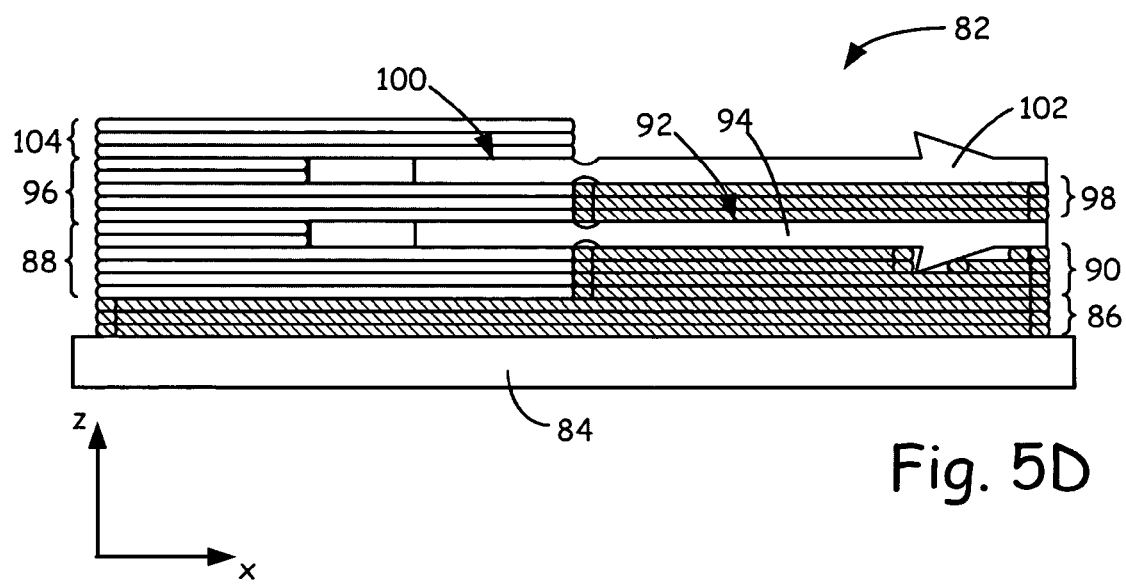

FIG. 5D shows 3D object 82 after snap fastener 102 is placed in region 100, and build layers 104 are formed. After build layers 96 and support layers 98 are formed, snap fastener 102 is placed in 3D object 92 at region 100. Snap fastener 102 is an insert corresponding to STL insert 70 (shown in FIGS. 4A-4C), and may be placed in region 100 manually or in an automated manner. In situations where snap fastener 102 is laterally offset enough to prevent a potential collision with a deposition head of the RP/RM system, the placement of snap fastener 102 in region 100 desirably provides a substantially flush surface between snap fastener 102 and the top layer of build layers 96. Alternatively, a crown insert (not shown) may be placed over a portion of snap fastener 102 to provide a suitable vertical offset between snap fastener 102 and build layers 104. Examples of suitable techniques for placing and using crown inserts are discussed below in FIGS. 9A-9D. After snap fastener 102 is placed in region 100, the RP/RM system then forms build layers 104 of 3D object 82 on top of build layers 96 and snap fastener 102, where build layers 104 are also based on the generated build paths of sliced layers 72 (shown in FIG. 4D). After the build operation is complete, the resulting 3D object 82 may be removed from the RP/RM system, and support layers 86, 90, and 98 may be removed.

Figure 5E:
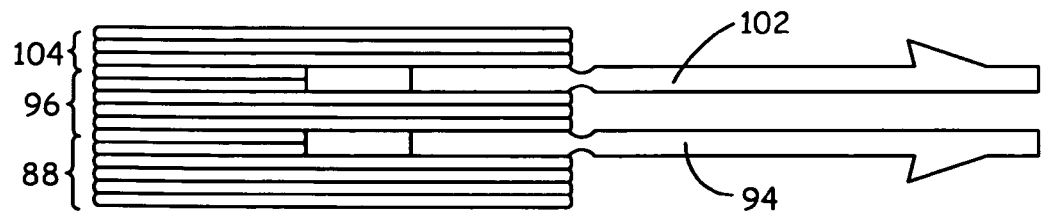

FIG. 5E shows 3D object 82 after removal from the RP/RM system, and after support layers 86, 90, and 98 (shown in FIG. 5D) are removed. The resulting 3D object 82 includes opposing snap fasteners 94 and 102 partially embedded within the layers of 3D object 82 (i.e., build layers 88, 96, and 104), which corresponds to the data representations of CAD model 64 (shown in FIG. 4A). The opposing arrangement of snap fasteners 94 and 102 allow 3D object 82 to be fastened to a mating opening in a separate component (not shown), thereby providing a functional connection point for 3D object 82. As discussed above, pursuant to method 10, snap fasteners 94 and 102 are properly placed in 3D object 82 due to the formation of unfilled regions 78 and 80 (shown in FIG. 4D) after support layers 74 and 76 (shown in FIGS. 4C and 4D) are generated. This allows snap fasteners 94 and 102 to be readily placed in 3D object 82 without interference from support layers 86, 90, and 98 and build layers 88, 96, and 104.

FIGS. 6A and 6B are schematic views of CAD model 106, which illustrate an alternative application of the subtraction operation in step 22 of method 10 (shown in FIG. 1). As shown in FIG. 6A, CAD model 106 is a data representation of a third exemplary 3D object, and includes STL object 108 and STL insert 110. STL object 108 is a data representation of the 3D object to be built in a layer-by-layer manner with the RP/RM system (not shown), and STL insert 110 is a data representation of a rod insert that will be placed in the 3D object during the build operation. Steps 12-20 of method 10 are performed in the same manner as discussed above, where the slicing of CAD model 106 (step 18) provides sliced layers 112, and the generation of support layers (step 20) provides support layers 114.

As shown in FIG. 6B, after support layers 114 are generated, the host computer then performs the subtraction operation, pursuant to step 22 of method 10, to form unfilled region 116. However, in this embodiment, unfilled region 116 has a lateral width (referred to as lateral width 116a) that is less than a lateral width of STL insert 110 (referred to as lateral width 110a). Thus, the lateral dimensions of unfilled region 116 are undersized relative to the lateral dimensions of STL insert 110. This provides a tight fit for the rod insert corresponding to STL insert 110, and is suitable for a variety of applications, such as heat staking applications and threaded screw/bolt insertions.

The undersized dimensions of unfilled region 116 may be generated using a variety of techniques. In one embodiment, prior to the subtraction operation in step 22 of method 10, the lateral dimensions of the embedded portion of STL insert 110 (referred to as portion 118) are reduced from lateral width 110a to lateral width 116a. This may be performed using a separate subtraction operation, where the dimensions corresponding to portion 118 are subtracted from STL insert 110 with the use of an additional STL geometry (not shown). Pursuant to step 22 of method 10, the host computer then performs the subtraction operation on CAD model 106 using the reduced-dimension STL insert 110. The dimensions of portion 118 accordingly form unfilled region 116 having lateral width 116a.

In an alternative embodiment, the geometry of STL insert 110 is not modified. Instead, after the subtraction operation in step 22 of method 10, the host computer performs an addition operation on unfilled region 116, where the additional STL geometry that provided portion 118 is added to the walls of unfilled region 116 (rather than subtracted from STL insert 110). This embodiment also reduces the lateral dimensions of unfilled region 116 to that of lateral width 116a. In an additional alternative embodiment, the host computer reduces the size of unfilled region 116 after the slicing operation. In this embodiment, the host computer modifies the polyline slice geometry using an offset operation to obtain the geometry of lateral width 116a, where the offset amount is the difference between the lateral width 110a and lateral width 116a.

After unfilled region 116a is formed, build paths for sliced layers 112 and support layers 114 are generated (step 24), and the resulting build sequence data is relayed to the RP/RM system (not shown) for performing the build operation to fabricate the 3D object and corresponding support structure (step 26). During the build operation, the rod insert corresponding to STL insert 110 is forced into the undersized region corresponding to unfilled region 116, thereby providing secure fit for the rod insert. Accordingly, this alternative application of step 22 of method 10 may be used to modify geometries of a variety of unfilled regions to adjust the sizes of the unfilled regions relative to the inserts.

While the embodiment discussed above provides an unfilled region (i.e., unfilled region 116) having a tight clearance fit relative to the insert, in an alternative embodiment, a large clearance fit may be provided for an unfilled region using similar techniques. In this embodiment, the dimensions of the STL insert may be increased (rather than decreased) prior to forming the unfilled region. This provides a loose clearance fit for the placed insert.

Figure 7:
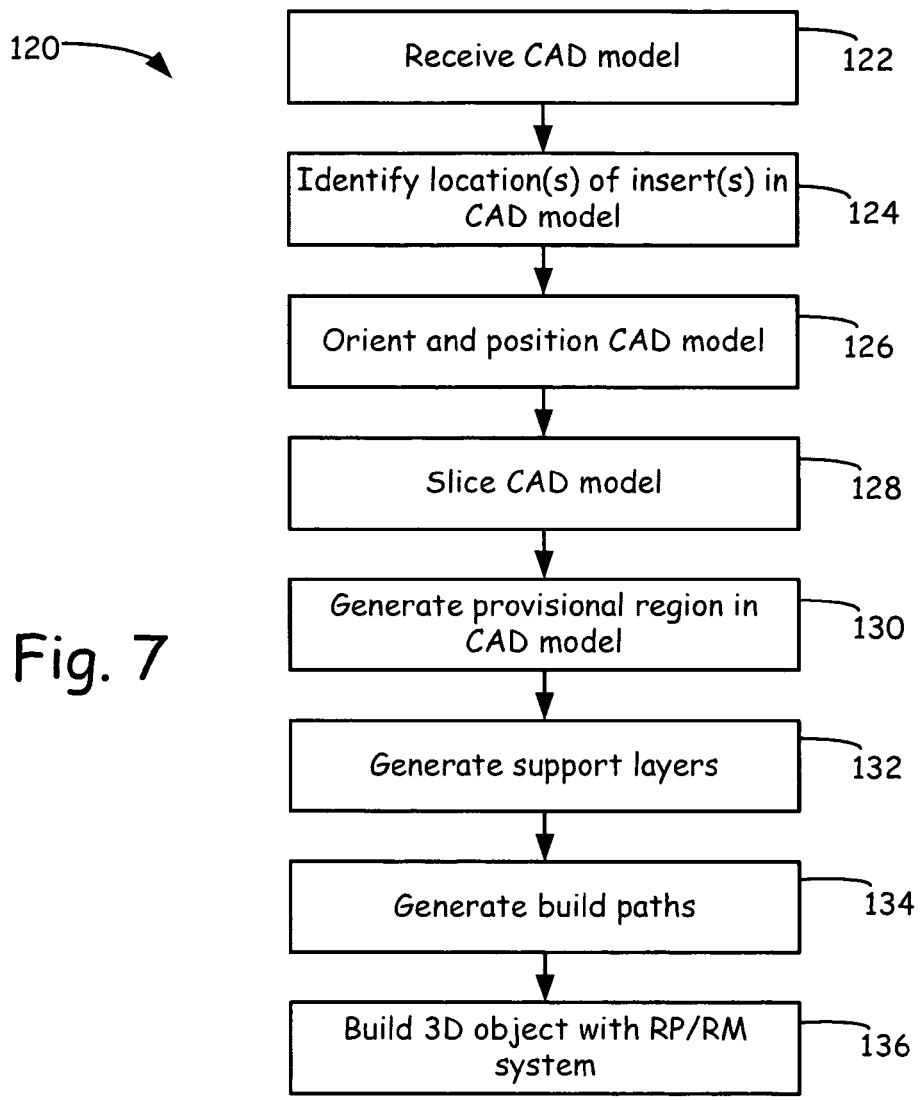
FIG. 7 is a flow diagram of an alternative method for generating build sequence data for a 3D object containing one or more embedded inserts.

FIG. 7 is a flow diagram of method 120 for generating build sequence data for a 3D object containing one or more embedded inserts, and is an alternative to method 10 (shown in FIG. 1). As shown in FIG. 7, method 120 includes steps 122-136, where steps 122-128 are performed in the same manner as discussed above in steps 12-18 of method 10 (shown in FIG. 1). After the CAD model is sliced into a plurality of horizontal layers, pursuant to step 128 of method 120, the host computer replaces the geometries of the insert data representation(s) in the CAD model with provisional region(s) (step 130). The provisional region(s) may be formed with Boolean logic techniques. For example, the geometries of the insert data representation(s) are subtracted from the CAD model and the provisional region(s) are added to CAD model at the identified location(s) of the insert data representation(s). In an alternative embodiment, the provisional region(s) may be generated in step 130 before the CAD model is sliced in step 128. In this embodiment, the slicing of the CAD model in step 128 may also slice the provisional region(s).

As discussed below, the provisional region(s) are regions that the host computer treat as if they are filled regions, or are otherwise defined to have no perimeter or raster fills, for purposes of generating the support layers (pursuant to step 132 of method 120), and as unfilled regions for purposes of generating the build paths (pursuant to step 134 of method 120). Accordingly, after the provisional region(s) are formed, the host computer generates support layers for providing vertical support to any overhanging surfaces of the sliced layers of the CAD model (step 132), where the host computer functions as if the provisional region(s) are filled regions of the 3D object, or the provisional region(s) are otherwise defined to have no perimeter or raster fills. Thus, the host computer does not generate support layers within the provisional region(s) of the CAD model, thereby providing unfilled region(s) at the identified locations of the insert data representation(s). In comparison to the embodiment of method 10, in which the unfilled region(s) are generated after the support layers are generated, the use of the provisional region(s) in method 120 effectively provides the unfilled region(s) in the CAD model before the support layers are generated. This is also beneficial for preventing the support layers from being generated in the unfilled region(s), which would otherwise prevent the insert(s) from being placed within the 3D object during the build operation.

After the support layers are generated, the host computer generates build paths for the sliced layers of the 3D object and the generated support layers (step 134), where the host computer functions as if the provisional region(s) are unfilled regions. As such, the build paths for the sliced layers of the 3D object and the generated support layers do not enter the provisional region(s) of the CAD model. The host computer may also generate one or more pause times in the build sequence for allowing the insert(s) to be placed in the 3D object.

After the build paths are generated, the resulting build sequence data is relayed to an RP/RM system for performing the build operation to fabricate the 3D object and corresponding support layers (step 136). In one embodiment, the RP/RM system is a system that includes an automated insert-placement apparatus as disclosed in U.S. patent application Ser. No. 12/006,947 entitled "System for Building Three-Dimensional Objects Containing Embedded Inserts, and Methods of Use Thereof". Method 120 correspondingly prevents build and support materials from filling the region(s) in which the insert(s) are to be placed during the build operation. This allows the insert(s) to be readily placed in the 3D object substantially without interference from the formed layers of the 3D object and the support layers.

Figure 8A:
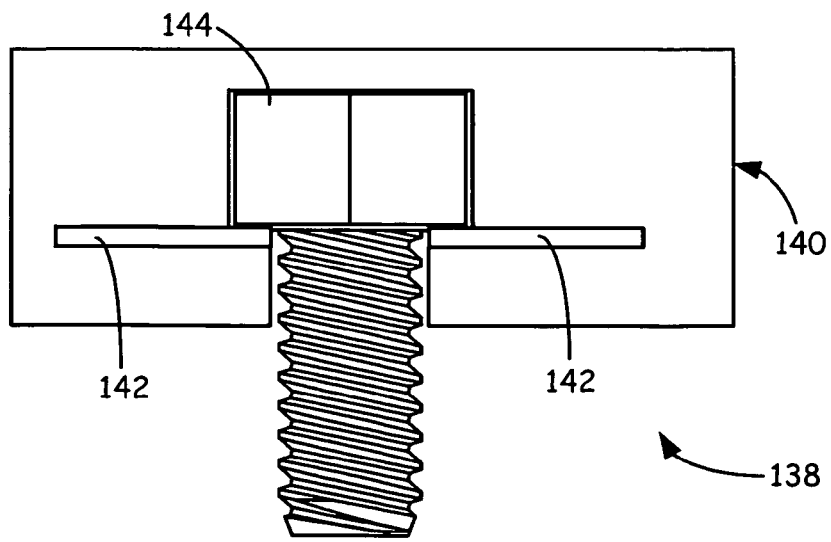
FIGS. 8A-8C are schematic views of a fourth CAD model, which illustrate the application of the method shown in FIG. 7.
Figure 8B:
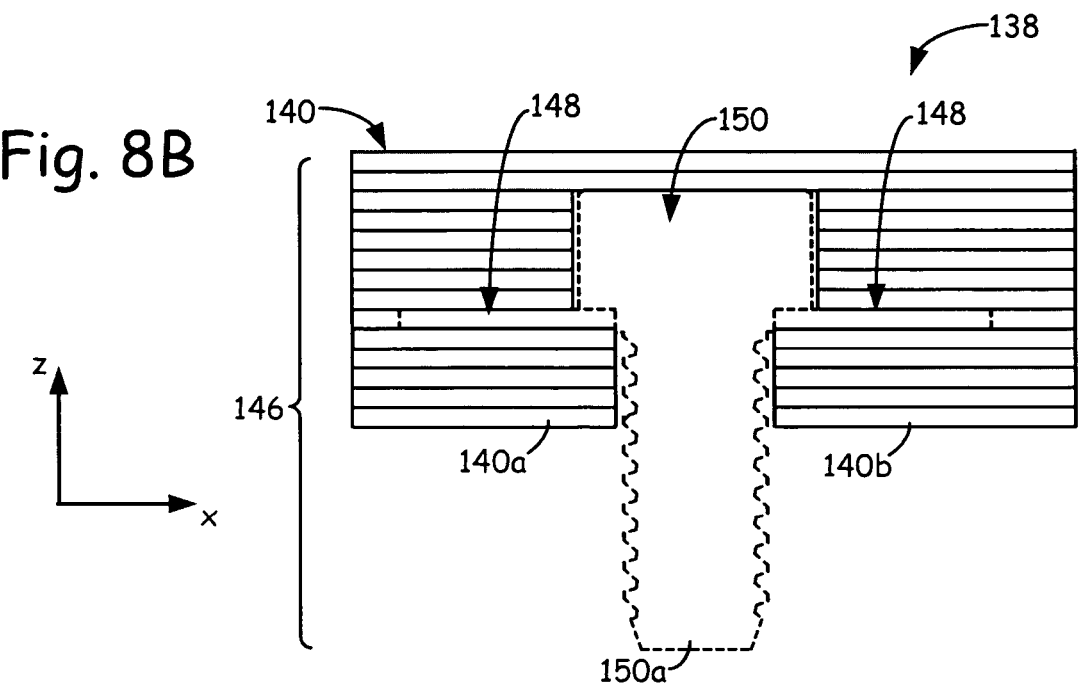
Figure 8C:
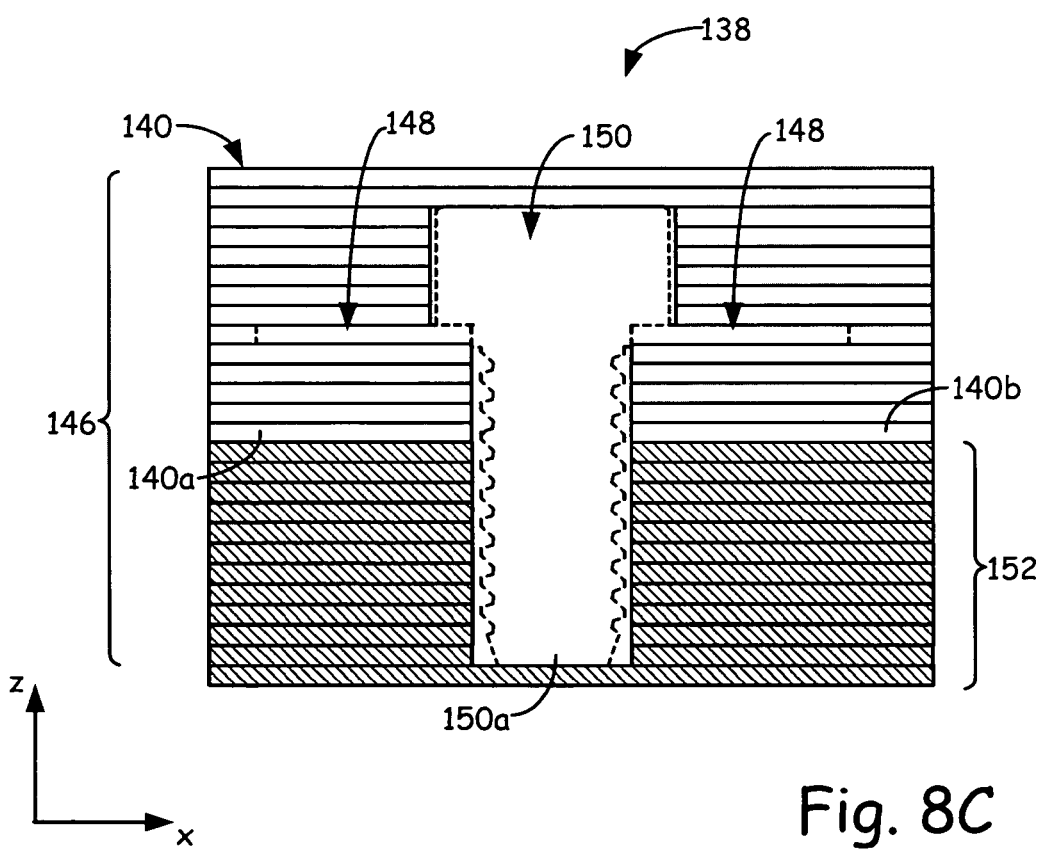

FIGS. 8A-8C are schematic views of CAD model 138, which illustrate the application of steps 122-134 of method 120 (shown in FIG. 8) to an exemplary 3D object. As shown in FIG. 8A, CAD model 138 is a data representation of the exemplary 3D object, and is identical to CAD model 28 (shown in FIG. 2A). CAD model 138 includes STL object 140 and STL inserts 142 and 144, where STL object 140 is a data representation of the 3D object to be built in a layer-by-layer manner with the RP/RM system (not shown). STL inserts 142 and 144 are data representations of a ring washer and a hex bolt, respectively, which are inserts that will be placed in the 3D object during the build operation.

Pursuant to method 120, the host computer receives CAD model 138 (step 122), and identifies the locations and orientations of STL inserts 142 and 144 (step 124). The host computer then orients and positions CAD model 138 along the x-axis, the y-axis, and the z-axis for the build operation (step 126). For ease of discussion, it is assumed that the orientation shown in FIG. 8A is the desired orientation of CAD model 138 for the build operation.

As shown in FIG. 8B, the host computer then slices CAD model 138 into sliced layers 146 (step 128), where sliced layers 146 are a plurality of layers disposed along the horizontal x-y plane. As discussed above, each sliced layer 146 desirably includes one or more polylines that define the geometry of the sliced layer in the horizontal x-y plane, and has a thickness corresponding to the vertical z-axis resolution of the RP/RM system. The thicknesses of sliced layers 146 are exaggerated in FIG. 8B for ease of discussion.

After sliced layers 146 are formed, the host computer then generates provisional regions 148 and 150 (shown with broken lines) at the respective locations of STL inserts 142 and 144 (shown in FIG. 8A) (step 130). As discussed above, provisional regions 148 and 150 may be generated with Boolean logic techniques. After provisional regions 148 and 150 are generated, the host computer then generates support layers for any overhanging portions of sliced layers 146 that require vertical support along the z-axis (e.g., sliced layers 140a and 140b) (step 132). As discussed above, pursuant to method 120, the host computer functions as if provisional regions 148 and 150 are filled regions, or provisional regions 148 and 150 are otherwise defined to have no perimeter or raster fills, for the purposes of generating the support layers. Thus, support layers are not generated within provisional regions 148 and 150. Additionally, support layers are generated for any overhanging portions of provisional regions 148 and 150 that require vertical support along the z-axis (e.g., portion 150a of provisional region 150).

FIG. 8C shows CAD model 138 with generated support layers 152, which are a plurality of support layers disposed along the horizontal x-y plane having thicknesses corresponding to the vertical z-axis resolution of the RP/RM system (not shown). As shown, support layers 152 provide vertical support for sliced layers 140a and 140b of STL object 140, and for portion 150a of provisional region 150. However, as discussed above, support layers 152 do not extend into provisional regions 148 and 150.

After support layers 152 are generated in step 132 of method 120, the host computer then generates build paths for sliced layers 146 and support layers 152 (step 134). As discussed above, when generating the build paths, the host computer functions as if provisional regions 148 and 150 are unfilled regions. Thus, the build paths for sliced layers 146 do not extend into provisional regions 148 and 150. This allows the ring washer insert and the hex bolt insert to be properly inserted within the 3D object during the build operation, without interference from the formed layers of the 3D object and support layers. Accordingly, the resulting build paths generated from CAD model 138, pursuant to step 134 of method 120, are the same as the build paths generated from CAD model 28 (shown in FIG. 2D), pursuant to step 24 of method 10. The resulting build sequence data is then relayed to the RP/RM system (not shown) for performing the build operation to fabricate the 3D object and corresponding support layers (step 136).

Methods 10 and 120 are suitable for generating build sequence data for a variety of different 3D objects, where the 3D object contains one or more embedded inserts. The type of insert used may vary depending on the desired function of the insert and on the layer-based additive technique used. For example, the inserts are desirably capable of withstanding elevated temperatures that occur with the various layer-based additive techniques. Examples of suitable inserts for use with methods 10 and 120 include mechanical inserts (e.g., bolts, screws, nuts, bearings, guides, and precision flats), anti-stick components, aesthetic features, electronic components, reinforcing inserts, and combinations thereof.

The inserts may also have variable geometries, such as inserts that are cut-to-size, bent, folded, torqued, stretched, tapped, sized, or otherwise modified from stock material shapes to the shape taken by the placed insert. For example, a flexible radio-frequency identification (RFID) tag may be conically bent to conform to the interior rim of a smoke detector shell, or a reinforcing wire might be cut and bent in a serpentine system to attain the shape taken by the placed insert. In one embodiment, the intended geometry may be defined by a CAD part designer, and information relating to the intended geometry may be transferred with the insert-placement location and description as part of the CAD model. Additional information that the RP/RM system might require to manipulate the insert (e.g., bending radius and wire tension) may also be supplied.

In one embodiment, the inserts include identification tag inserts, as disclosed in U.S. patent application Ser. No. 12/006,956, entitled "Method for Building and Using Three-Dimensional Objects Containing Embedded Identification-Tag Inserts". In an additional embodiment, the inserts may include one or more polymeric surfaces, as disclosed in Mannella, U.S. patent application Ser. No. 11/483,020, entitled "Method For Building Three-Dimensional Objects Containing Metal Parts".

FIGS. 9A-9D are perspective views of 3D object 154, which illustrate a particularly suitable technique for building 3D objects containing embedded inserts, pursuant to method 10 (shown in FIG. 1) and/or method 120 (shown in FIG. 7), where one or more of the embedded inserts have non-planar top surfaces. As discussed above in step 16 of method 10 (shown in FIG. 1) and in step 126 of method 120 (shown in FIG. 7), the host computer desirably orients and positions the CAD model in a spatial coordinate system to a desired orientation for the build operation. In many situations, however, the desired orientation of the CAD model requires that one or more of the inserts are oriented with non-planar top surfaces. During a build operation, the non-planar top surfaces of the insert(s) may restrict subsequent layers of the respective 3D object from being formed on top of the insert(s), and may also interfere with the movement of a deposition head of an RP/RM system. As discussed below, crown insert(s) may be placed over the insert(s) having the non-planar top surfaces, thereby providing substantially planar top surfaces for supporting the formation of subsequent layers.

Figure 9A:
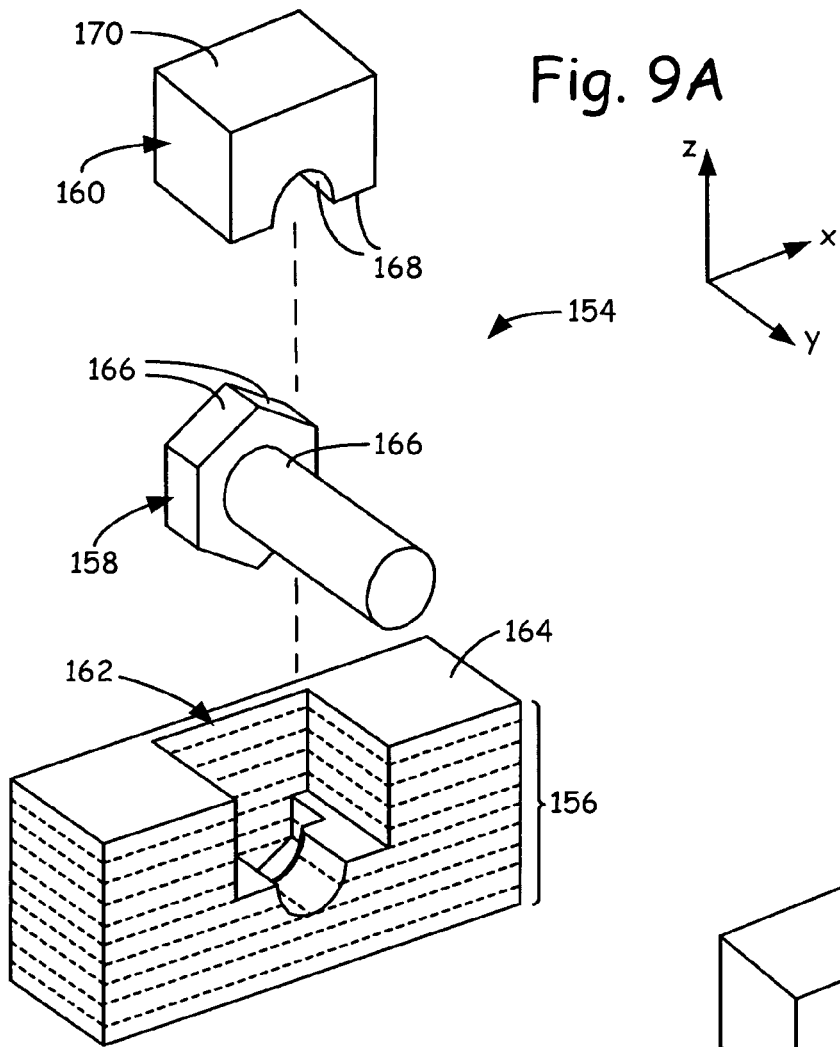
FIGS. 9A-9D are perspective views of a third exemplary 3D object being built with an embedded crown insert.

As shown in FIG. 9A, 3D object 154 includes build layers 156, hex bolt 158, and crown insert 160. Build layers 156 are layers of build material formed with an RP/RM system (not shown) using a layer-based additive technique, based on generated sliced layers (not shown). The thicknesses of build layers 156 are exaggerated in FIGS. 9A-9D for ease of discussion. Build layers 156 partially define region 162, which corresponds to an unfilled region (not shown) of a data representation of 3D object 154 (not shown). As such, the dimensions of region 162 substantially match the combined dimensions of hex bolt 158 and crown insert 160. Build layers 156 are formed up to a point where hex bolt 158 and crown insert 160 are to be placed in 3D object 154, thereby defining top layer 164.

Hex bolt 158 is a first insert to be placed in region 162, and includes top surfaces 166, which are non-planar top surfaces along the vertical z-axis based on the given spatial orientation of hex bolt 158. Crown insert 160 is a second insert to be placed in region 162, over a portion of hex bolt 158, and includes bottom surfaces 168 and top surface 170. Bottom surfaces 168 are the bottom external surfaces of crown insert 160, and at least a portion of bottom surfaces 168 correspond to the dimensions of top surfaces 166 of hex bolt 158. This allows crown insert 160 to be vertically supported by hex bolt 158 when placed in region 162. Top surface 170 of crown insert 160 is a top external surface of crown insert 160, and is substantially planar in the horizontal x-y plane. Crown insert 160 may be formed from a variety of different materials, and is desirably formed from, or treated with, a material that allows subsequent layers of build and/or support materials to be formed on top of top surface 170. In one embodiment, crown insert 160 is formed with an RP/RM system using a layer-based additive technique.

Build layers 156 are formed with an RP/RM system based on build sequence data generated pursuant to method 10 and/or method 120. Accordingly, region 162 may be generated pursuant to the techniques discussed in step 22 of method 10 (shown in FIG. 1) and steps 132 and 134 of method 120 (shown in FIG. 7). For example, the dimensions of the unfilled region corresponding to region 162 may be generated by subtracting the combined volumes of an insert data representation of hex bolt 158 and an insert data representation of crown insert 160 from the data representation of 3D object 154. This provides an unfilled region having a substantially planar top surface and a bottom surface that corresponds to the dimensions of hex bolt 158.

In an alternative embodiment in which an insert data representation of crown insert 160 is not provided, the unfilled region corresponding to region 162 may be generated by subtracting the dimensions of the insert data representation of hex bolt 158 from the data representation of 3D object 154, and then vertically extending the volume of the unfilled region by a given distance or a number of layers (e.g., 5-50 layers) by subtracting an additional volume vertically above the insert data representation of hex bolt 158. This also provides an unfilled region having a substantially planar top surface and a bottom surface that corresponds to the dimensions of hex bolt 158.

In an additional alternative embodiment in which an insert data representation of crown insert 160 is not provided, the unfilled region corresponding to region 162 may be generated by vertically extending the volume of the insert data representation of hex bolt 158 (i.e., adding an additional volume vertically above the insert data representation of hex bolt 158), and then subtracting the entire volume of the insert data representation of hex bolt 158 from the data representation of 3D object 154. This also provides an unfilled region having a substantially planar top surface and a bottom surface that corresponds to the dimensions of hex bolt 158.

Figure 9B:
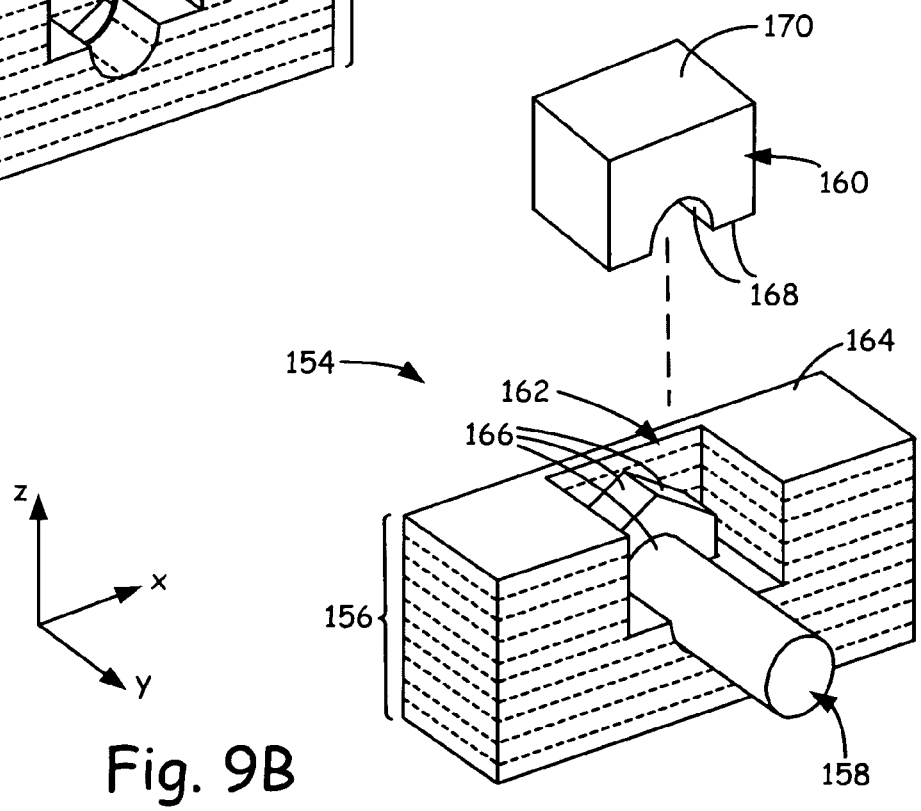

FIG. 9B shows hex bolt 158 placed in region 162, prior to the placement of crown insert 160. During the build operation, the RP/RM system forms build layers 156 up to top layer 164. This forms region 162 with dimensions substantially matching the combined dimensions of hex bolt 158 and crown insert 160. Hex bolt 158 is then placed in region 162, manually or in an automated manner. As shown, the orientation of hex bolt 158 causes top surfaces 166 to be facing upward along the vertical z-axis. As discussed above, the non-planar nature of top surfaces 166 may restrict the formation of subsequent layers on top of hex bolt 158, thereby reducing the efficiency in building 3D object 154 with the RP/RM system. However, the use of crown insert 160 provides a substantially planar top surface (i.e., top surface 170), which readily allows the subsequent layers to be formed.

Figure 9C:
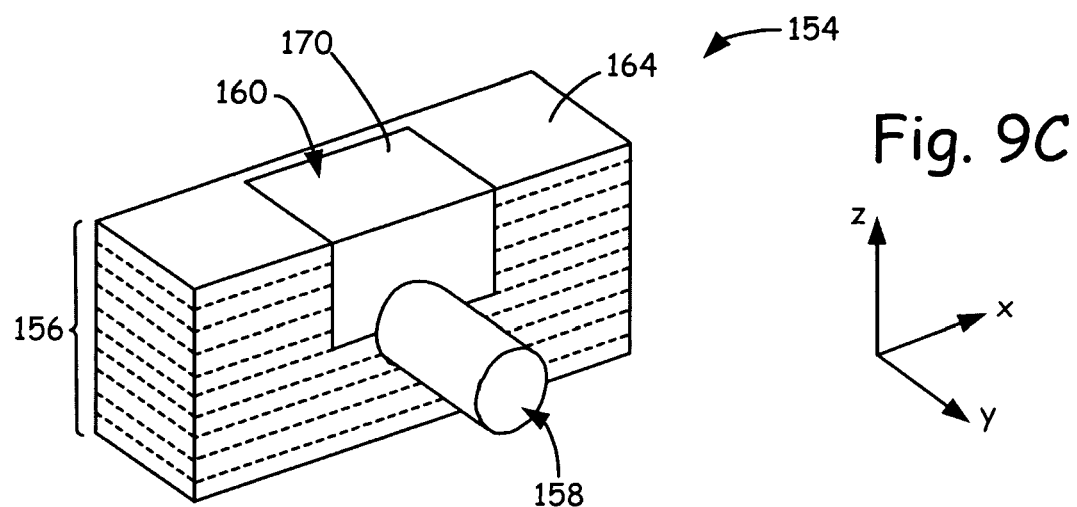

FIG. 9C shows crown insert 160 placed in region 162. As shown, after hex bolt 158 is placed in region 162 (shown in FIGS. 9A and 9B), and prior to the formation of subsequent layers of 3D object 154, crown insert 160 is placed in region 162 (manually or in an automated manner). This covers the non-planar top surfaces of hex bolt 158 (i.e., top surfaces 166, shown in FIGS. 9A and 9B) and provides a top surface that is substantially planar to the horizontal x-y plane (i.e., top surface 170). As such, the placement of crown insert 160 in region 162 provides a substantially flush surface between top surface 170 of crown insert 160 and top layer 164 of build layers 156.

Figure 9D:
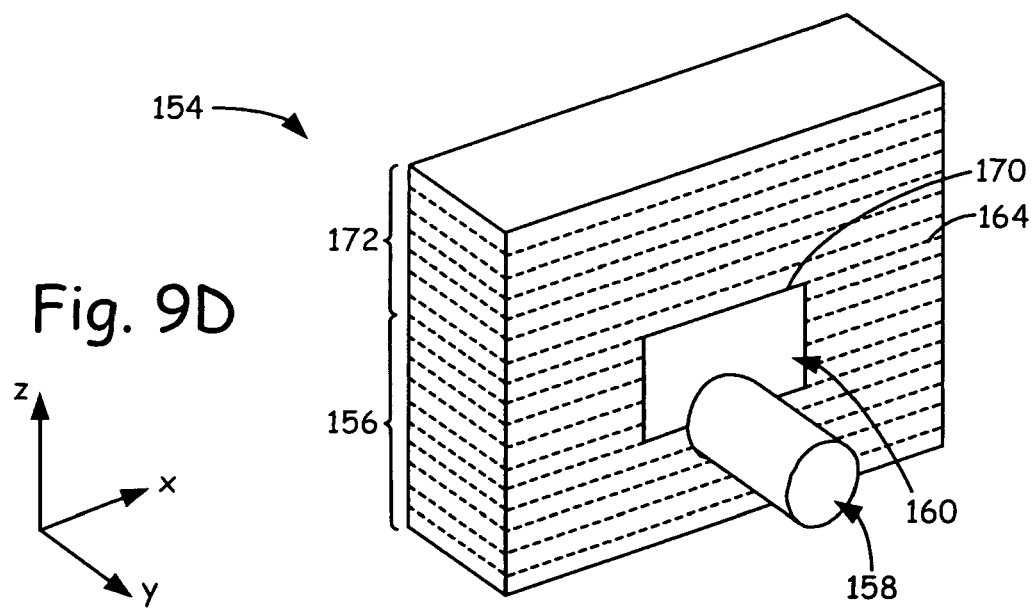

As shown in FIG. 9D, the substantially flush surface between top surface 170 of crown insert 160 and top layer 164 of build layers 156 allows the RP/RM system to build the subsequent layers of 3D object 154 (referred to as build layers 172) using the layer-based additive technique, where build layers 172 are formed on top of top layer 164 and top surface 170. Accordingly, the use of crown inserts (e.g., crown insert 160) allows a variety of inserts to be embedded within 3D objects regardless of the upward-facing features of the inserts. Furthermore, crown inserts may be used to cover inserts having top surfaces that are planar, but are otherwise non-compatible with given layer-based additive techniques (e.g., build materials do not adhere well to the top surfaces of the inserts). This further increases the versatility of embedding inserts in 3D objects pursuant to methods 10 and 120.

Although the present invention has been described with reference to preferred embodiments, workers skilled in the art will recognize that changes may be made in form and detail without departing from the spirit and scope of the invention.

The invention claimed is:

1. A method for generating build sequence data for a computer-aided design model of a three-dimensional object, with the use of a computer configured to communicate with a layer-based, additive manufacturing system, the method comprising:
   identifying a location of an insert data representation in the computer-aided design model;
   slicing the computer-aided design model and the insert data representation into a plurality of sliced layers;
   generating support layers for at least a portion of the plurality of sliced layers; and
   subtracting, by said computer, a geometry of the insert data representation from the plurality of sliced layers at the identified location to generate an unfilled region in the computer-aided design model after generating the support layers.

2. The method of claim 1, wherein the unfilled region extends into the support layers.

3. The method of claim 1, wherein slicing the computer-aided design model comprises generating at least one polyline for each of the plurality of sliced layers, and wherein subtracting the geometry of the insert data representation comprises modifying at least a portion of the polylines of plurality of sliced layers.

4. The method of claim 1, further comprising modifying a geometry of the unfilled region.

5. The method of claim 4, further comprising orienting the computer-aided design model in a spatial coordinate system prior to slicing the computer-aided design model.

6. The method of claim 1, further comprising:
   identifying a second location of a second insert data representation in the computer-aided design model; and
   subtracting a geometry of the second insert data representation from the plurality of sliced layers at the identified second location to generate a second unfilled region in the computer-aided design model after the support layers are generated.

7. The method of claim 1, wherein the insert data representation comprises a first data representation of a first insert and a second data representation of a crown insert configured to be placed vertically over at least a portion of the first insert.

8. The method of claim 1, further comprising generating build paths for the plurality of sliced layers and the support layers, wherein the build paths do not enter the unfilled region.

9. A method for generating build sequence data with the use of a computer configured to communicate with a layer-based, additive manufacturing system, the method comprising:
   receiving a computer-aided design model comprising an object data representation to the computer;
   identifying a location of at least one insert data representation in the object data representation;
   slicing the object data representation and the at least one insert data representation into a plurality of sliced layers;
   generating support layers for at least a portion of the plurality of sliced layers; and
   subtracting, by said computer, the at least one insert data representation from the object data representation at the identified location of the at least one insert data representation after generating the support layers.

10. The method of claim 9, further comprising orienting the object data representation and the at least one insert data representation in a spatial coordinate system before slicing the object data representation and the at least one insert data representation.

11. The method of claim 9, wherein the at least one insert data representation comprises:
   a first insert data representation having at least one non-planar surface; and
   a second insert data representation having a first surface and a second surface,
      wherein the first surface has dimensions that substantially match at least a portion of the at least one non-planar surface of the first insert data representation, and wherein the second surface is substantially planar.

12. The method of claim 11, further comprising subtracting a geometry of a separate data representation from the geometry of the first insert data representation.

13. The method of claim 9, wherein subtracting the at least one insert data representation from the object data representation generates an unfilled region that extends partially into the object data representation and partially into the support layers.

14. The method of claim 9, further comprising generating build paths for the plurality of sliced layers and the plurality of support layers after subtracting the at least one insert data representation from the object data representation.

15. A method for building a three-dimensional object from a computer-aided design model, the method comprising:
   identifying a location of an insert data representation in the computer-aided design model;
   slicing the computer-aided design model and the insert data representation into a plurality of sliced layers;
   generating support layers for at least a portion of the plurality of sliced layers;
   subtracting a geometry of the insert data representation from the computer-aided design model after the support layers are generated, thereby forming an unfilled region in the computer-aided design model;
   forming a plurality of layers using a layer-based additive technique, the plurality of layers being based on at least one of the plurality of sliced layers and the support layers; and placing an insert corresponding to insert data representations on at least one of the plurality of formed layers at a location corresponding to the unfilled region.

16. The method of claim 15, further comprising orienting the computer-aided design model in a spatial coordinate system before slicing the computer-aided design model.

17. The method of claim 15, further comprising modifying a geometry of the unfilled region prior to forming the plurality of layers.

18. The method of claim 17, wherein modifying the geometry of the unfilled region comprises reducing a geometry of the insert data representation prior to subtracting the geometry of the insert data representation from the computer-aided design model.

19. The method of claim 15, further comprising:
identifying a location of a second insert data representation in the computer-aided design model; and
subtracting a geometry of the second insert data representation from the computer-aided design model after the support layers are generated, thereby forming a second unfilled region in the computer-aided design model.

20. The method of claim 15, further comprising generating build paths for the plurality of sliced layers and the support layers, wherein the build paths do not enter the unfilled region.

* * * * *